US009143795B2

(12) United States Patent
Zhou et al.

(10) Patent No.: US 9,143,795 B2
(45) Date of Patent: Sep. 22, 2015

(54) PARALLEL MOTION ESTIMATION IN VIDEO CODING

(75) Inventors: Minhua Zhou, Plano, TX (US);
Vivienne Sze, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 834 days.

(21) Appl. No.: 13/438,406

(22) Filed: Apr. 3, 2012

(65) Prior Publication Data

US 2012/0257678 A1    Oct. 11, 2012

Related U.S. Application Data

(60) Provisional application No. 61/473,987, filed on Apr. 11, 2011, provisional application No. 61/481,780, filed on May 3, 2011, provisional application No. 61/587,042, filed on Jan. 16, 2012, provisional application No. 61/590,430, filed on Jan. 25, 2012.

(51) Int. Cl.
*H04N 19/00* (2014.01)
*H04N 19/436* (2014.01)
*H04N 19/52* (2014.01)

(52) U.S. Cl.
CPC ............. *H04N 19/436* (2014.11); *H04N 19/52* (2014.11)

(58) Field of Classification Search
CPC ....................................................... H04N 19/56
USPC .................................................... 375/240.12
See application file for complete search history.

(56) References Cited

U.S. PATENT DOCUMENTS

2012/0195368 A1*  8/2012  Chien et al. .............. 375/240.02

OTHER PUBLICATIONS

Thomas Wiegand et al., "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, Geneva, Switzerland, Mar. 16-23, 2011, pp. 1-215.
Benjamin Bross et al., "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, Torino, Italy, Jul. 14-22, 2011, pp. 1-217.
Minhua Zhou, "Parallelized Merge/Skip Mode for HEVC", JCTVCF069, Joint Collaborative Team on Video Coding (JCT-VC) of ITU-T SG16 WP3 and ISO/IEC JTC1/SC29/WG11, Torino, Italy, Jul. 14-22, 2011, pp. 1-13.

(Continued)

*Primary Examiner* — Sath V Perungavoor
*Assistant Examiner* — Jeffery Williams
(74) *Attorney, Agent, or Firm* — Peter K. McLarty; Frank D. Cimino

(57) ABSTRACT

Methods for improved parallel motion estimation are provided that decouple the merging candidate list derivation and motion estimation for merge mode and skip mode and the advanced motion vector predictor (AMVP) candidate list construction from regular motion estimation to increase the coding quality in parallel motion estimation while meeting throughput requirements. This decoupling may be accomplished by modifying the availability rules for spatial motion data (SMD) positions for construction of the candidate lists. As part of the decoupling, largest coding units (LCUs) of a picture may be divided into non-overlapping parallel motion estimation regions (PMER) of equal size. Within a PMER, motion estimation for merge mode, skip mode, and normal inter-prediction mode may be performed in parallel for all the prediction units (PUs) in the PMER.

8 Claims, 13 Drawing Sheets

(56) References Cited

OTHER PUBLICATIONS

Minhua Zhou, "CE9: Test Results on Parallelized Merge/Skip Mode", JCTVC-G085, Joint Collaborative Team on Video Coding (JCT-VC) of ITU-T SG16 WP3 and ISO/IEC JTC1/SC29/WG11, Geneva, Switzerland, Nov. 19-30, 2011, pp. 1-15.

Minhua Zhou, "CE9: Test Results on Parallelized Merge/Skip Mode", JCTVC-G085, presentation at JCTVC meeting, Geneva, Switzerland, Nov. 19-30, 2011, pp. 1-10.

Minhua Zhou et al., "JCT-VC AHG report: Parallel Merge/Skip (AHG 10)", JCTVC-H0010, Joint Collaborative Team on Video Coding (JCT-VC) of ITU-T SG16 WP3 and ISO/IEC JTC1/SC29NVG11, San Jose, CA, Feb. 1-10, 2012, pp. 1-13.

Benjamin Bross et al., "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, Geneva, Switzerland, Nov. 21-30, 2011, pp. 1-223.

Minhua Zhou, "AHG10: Configurable and CU-Group Level Parallel Merge/Skip", JCTVC-H0082, presentation at JCTVC meeting, San Jose, CA, Feb., 1-10, 2012, pp. 1-16.

"TMS320DM6467 Digital Media System-on-Chip", SPRS403G, Texas Instruments Incorporated, Dec. 2007, revised Oct. 2010, pp. 1-351.

Benjamin Bross et al., "High Efficiency Video Coding (HEVC) Text Specification Draft 6", JCTVC-H1003, Nov. 21-30, 2011, pp. 1-249, Joint Collaborative Team on Video Coding (JCT-VC) of ITU-T SG16 WP3 and ISO/IEC JTC1/SC29/WG11, Geneva, Switzerland.

Hui Yong Kim et al., "AHG10: Unified Design on Parallel Merge/Skip with Reduced Candidates", JCTVC-H0247, Joint Collaborative Team on Video Coding (JCT-VC) of ITU-T SG16 WP3 and ISO/IEC JTC1/SC29NVG11, San Jose, CA, Feb. 1-10, 2012, pp. 1-7.

Yongjoon Jeon et al., "AHG10: Unified Design on Parallel Merge/Skip", JCTVC-H0090, Joint Collaborative Team on Video Coding (JCT-VC) of ITU-T SG16 WP3 and ISO/IEC JTC1/SC29/WG11, San Jose, CA, Feb. 1-10, 2012, pp. 1-10.

Minhua Zhou, "AHG10: Configurable and CU-Group Level Parallel Merge/Skip", JCTVC-H0082, Joint Collaborative Team on Video Coding (JCT-VC) of ITU-T SG16 WP3 and ISO/IEC JTC1/SC29/WG11, San Jose, CA, Feb. 1-10, 2012, pp. 1-14.

\* cited by examiner

PARALLEL MOTION ESTIMATION IN VIDEO CODING

CROSS-REFERENCE TO RELATED APPLICATIONS

This application claims benefit of U.S. Provisional Patent Application Ser. No. 61/473,987, filed Apr. 11, 2011, U.S. Provisional Patent Application Ser. No. 61/481,780, filed May 3, 2011, U.S. Provisional Patent Application Ser. No. 61/587,042, filed Jan. 16, 2012, and U.S. Provisional Patent Application Ser. No. 61/590,430, filed Jan. 25, 2012, all of which are incorporated herein by reference in their entirety.

BACKGROUND OF THE INVENTION

1. Field of the Invention

Embodiments of the present invention generally relate to parallel motion estimation in video coding.

2. Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). HEVC is expected to provide around 50% improvement in coding efficiency over the current standard, H.264/AVC, as well as larger resolutions and higher frame rates. Several coding efficiency enhancement tools are proposed in HEVC, among them a merge mode designed to reduce coding overhead by allowing an inter-predicted prediction unit (PU) to inherit motion data, i.e., motion vectors, prediction direction, and reference picture indices, from a position selected from neighboring motion data positions in the same picture and a temporal motion data position derived based on a co-located block of the same size as the PU in a reference picture, referred to as the co-located PU.

A skip mode is also included that can be seen as a coding unit (CU) level merge mode with all zero transform coefficients. Regular motion vector coding for inter-prediction of a PU also considers motion vectors of selected neighboring motion data positions in the same picture and a temporal motion data position derived based on a co-located PU for use as motion vector predictors for the PU. While the currently defined merge mode, skip mode, and regular motion vector prediction do reduce coding overhead, additional improvements are desirable.

SUMMARY

Embodiments of the present invention relate to methods and apparatus for parallel motion estimation in video coding. In one aspect, a method for derivation of spatial motion data (SMD) candidates for a prediction unit (PU) in video coding or decoding is provided in which the derived SMD candidates are for inclusion in an inter-prediction candidate list for the PU. The method includes determining an SMD position corresponding to an SMD candidate for the PU, wherein the PU is included in a parallel motion estimation region (PMER), selecting at least some motion data of the SMD position as the SMD candidate when the SMD position is not in the PMER and the motion data is available, and indicating that the SMD candidate is not available when the SMD position is in the PMER.

In one aspect, a method for parallel motion estimation in a video encoder is provided that includes dividing a largest coding unit (LCU) of a picture in a video stream into a plurality of prediction units (PUs) and into a plurality of non-overlapping parallel motion estimation regions (PMERs) of equal size, wherein a PMER of the plurality of PMERs includes a plurality of the PUs, and performing motion estimation on the plurality of PUs in the PMER in parallel. The parallel motion estimation includes construction of a merging candidate list for each PU in the PMER by determining a spatial motion data (SMD) position corresponding to a spatial merging candidate for the PU, selecting motion data of the SMD position as the spatial merging candidate when the SMD position is not in the PMER and the motion data is available, and indicating that the spatial merging candidate is not available when the SMD position is in the PMER.

In one aspect, a method for decoding an encoded video bit stream in a video decoder is provided that includes receiving a size of parallel motion estimation regions (PMERs) in an encoded largest coding unit (LCU) in encoded video stream, and decoding the encoded LCU. The decoding of the encoded LCU includes construction of a merging candidate list for a first inter-predicted PU comprised in a first PMER of the encoded LCU by determining a spatial motion data (SMD) position corresponding to a spatial merging candidate for the first inter-predicted PU, selecting motion data of the SMD position as the spatial merging candidate when the SMD position is not in the first PMER and the motion data is available, and indicating that the spatial merging candidate is not available when the SMD position is in the first PMER.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
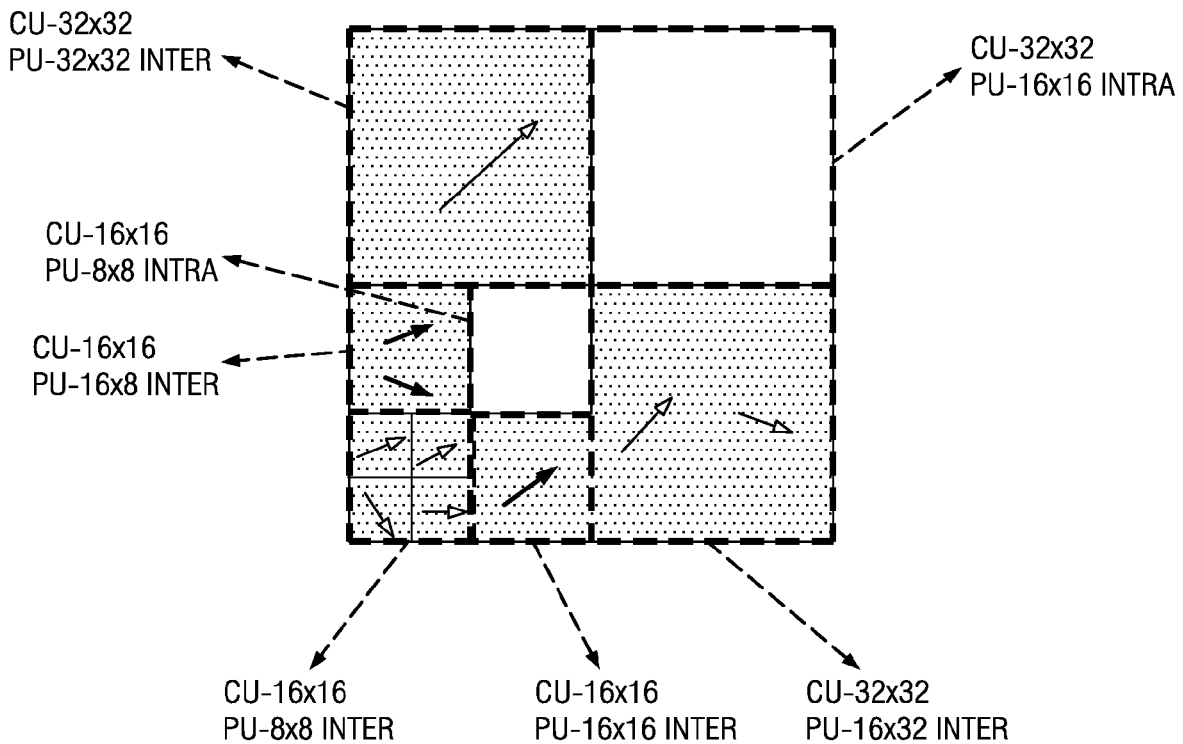
FIG. 1 shows an example of decomposition of a largest coding unit (LCU) into coding units (CUs) and prediction units (PUs)

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC. One of ordinary skill in the art will understand that embodiments of the invention are not limited to HEVC. In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the LCU and the size of the smallest CU (SCU) permitted.

The coding node is the root node of two trees, a prediction tree and a transform tree. A prediction tree specifies the position and size of prediction units (PU) for a coding unit. A PU is the basic unit for carrying the information related to the prediction processes such as inter and intra-prediction. In general, a PU is not restricted to a square shape in order to facilitate partitioning that matches boundaries of real objects in a picture. A CU may be partitioned into one or more PUs. A transform tree specifies the position and size of transform units (TU) for a coding unit. A transform unit may not be larger than a coding unit. The sizes of the transforms units and prediction units for a CU are determined by the video encoder during prediction based on minimization of rate/distortion costs. FIG. 1 shows an example of an LCU of size 64×64 that is decomposed into CUs and PUs. In this example, the SCU size is 16×16. In HEVC, the SCU size may be as small as 8×8.

As used herein, a co-located PU or temporally co-located PU is a rectangular or square area in a reference picture having the same coordinates, size, and shape of a PU in a picture currently being encoded or decoded, i.e., a PU for which a merging candidate list or an advanced motion vector predictor (AMVP) candidate list is being constructed. As is well-known, PU partitioning may change from LCU to LCU, and from picture to picture. Thus, a co-located PU does not necessarily correspond to an actual PU of the reference picture. Rather, depending on the size, the co-located PU may overlap one actual PU, multiple actual PUs, portions of several actual PUs, a portion of an actual PU, etc. in the reference picture.

As used herein, a co-located CU or temporally co-located CU is a square area in a reference picture having the same coordinates, size, and shape of a CU in a picture currently being encoded or decoded, i.e., a CU for which a merging candidate list is being constructed. As is well-known, CU partitioning may change from LCU to LCU, and from picture to picture. Thus, a co-located CU does not necessarily correspond to an actual CU of the reference picture. Rather, depending on the size, the co-located CU may overlap one actual CU, multiple actual CUs, portions of several actual CUs, a portion of an actual CU, etc. in the reference picture.

As used herein, a co-located LCU or temporally co-located LCU is a square area in a reference picture having the same coordinates, size, and shape of an LCU in a picture currently being encoded or decoded, i.e., an LCU containing the PU for which a merging candidate list or an advanced motion vector predictor (AMVP) candidate list is being constructed or the CU for which a merging candidate list is being constructed. As is well-known, LCU partitioning may change from picture to picture if the two pictures refer to different sequence parameter sets (SPS). Thus, a co-located LCU does not necessarily correspond to an actual LCU of the reference picture. Rather, depending on the size, the co-located LCU may overlap one actual LCU, multiple actual LCUs, portions of several actual LCUs, a portion of an actual LCU, etc. in the reference picture.

Some aspects of this disclosure have been presented to the JCT-VC in the following documents: M. Zhou, "Parallelized Merge/Skip Mode for HEVC," JCTVC-F069, Jul. 14-22, 2011, M. Zhou, "CE9: Test Results on Parallelized Merge/Skip Mode," JCTVC-G085, Nov. 19-30, 2011, and M. Zhou, "AHG10: Configurable and CU-Group Level Parallel Merge/Skip," JCTVC-H0082, Feb. 1-10, 2012, which are incorporated by reference herein in their entirety.

As previously discussed, merge mode, skip mode, and regular motion vector coding based on spatially neighboring PUs and a temporally co-located PU for inter-prediction of PUs are proposed in HEVC. General descriptions of merge mode, skip mode, and regular motion vector coding are provided herein. More detailed descriptions of the emerging proposal may be found in K. McCann, et al., "High Efficiency Video Coding (HEVC) Test Model 2 (HM 2) Encoder Description," JCTVC-D502, Joint Collaborative Team on Video Coding (JCT-VC) of ITU-T SG16 WP3 and ISO/IEC JTC1/SC29/WG11, Guangzhou, CN, Oct. 7-15, 2010, and T. Wiegand, et al., "WD2: Working Draft 2 of High-Efficiency Video Coding," JCTVC-D503, Joint Collaborative Team on Video Coding (JCT-VC) of ITU-T SG16 WP3 and ISO/IEC JTC1/SC29/WG11, Daegu, Korea, Jan. 20-28, 2011 ("WD2"), T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding, JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding, JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), and B. Bross, et al., "High Efficiency Video Coding (HEVC) Text Specification Draft 6, JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), all of which are incorporated by reference herein.

In HEVC, the minimum PU size is 4×4, i.e., samples in a 4×4 region share a same set of motion data when the PU is inter-predicted, and an inter-predicted PU of a larger size can be treated as a multiple of 4×4 blocks which share the motion data of the PU. For simplicity of the implementation, for advanced motion vector predicator (AMVP) and merging candidate list derivation, the motion data may be populated to the 4×4 block level regardless of PU size. For example, if a neighboring inter-predicted PU is 16×16, the same set of PU motion data is replicated 16 times for the 4×4 blocks of the PU and stored. In this way, the motion data from neighboring 4×4 blocks in the relevant locations can be fetched to derive the AMVP or merging candidates without the need to know the actual neighboring PU sizes to compute the motion data location. In WD3, WD4, WD5, and HEVC Draft 6, the motion data is populated to sample (pixel) level for the simplicity of description. In actual implementation, such a motion data storage format, i.e., sample-based, may not be used due to memory usage considerations. In the description herein, the various motion data blocks specify the locations from which the neighboring motion data, both spatial and temporal, should be fetched. The encoder or decoder has the responsibility to determine which PU contains a motion data block and to fetch the PU motion data accordingly. The simplest way to realize this functionality, and to avoid an on-the-fly computation, is to store the motion data for a PU at the 4×4 block level once motion data is determined for that PU.

Figure 2:
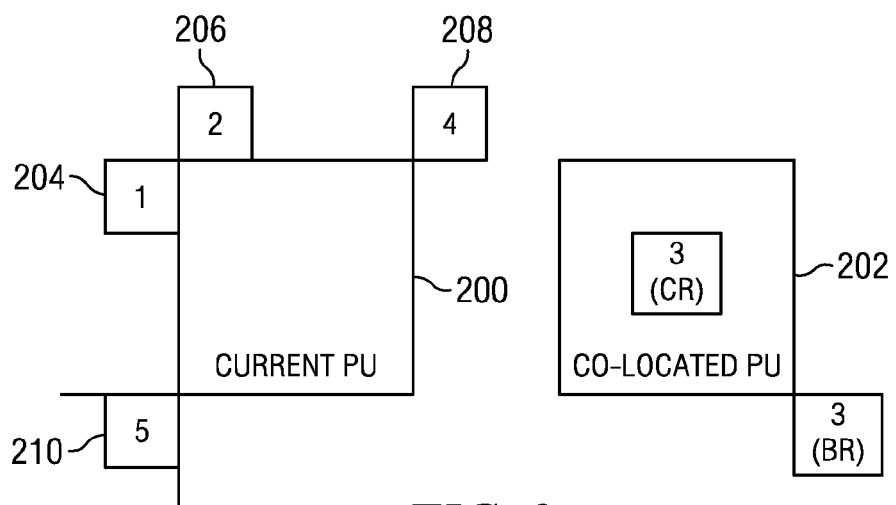
FIG. 2 is a block diagram illustrating prior art spatial and temporal motion data positions for constructing a merging candidate list.

In general, merge mode allows an inter-predicted PU to inherit the same motion vector(s), prediction direction, and a reference picture index (or indices) from an inter-predicted PU which contains a motion data position selected from a group of spatially neighboring motion data positions and one of two temporally co-located motion data positions. FIG. 2 illustrates candidate motion data positions for the merge mode as defined in WD3. For the current PU 200, the encoder forms a merging candidate list by considering merging candidates from the motion data positions depicted in FIG. 2: four spatially neighboring motion data (SMD) positions, i.e., a left neighboring SMD position 204, an upper neighboring SMD position 206, an upper right neighboring SMD position 208, and a bottom left neighboring SMD position 210, and two temporal motion data (TMD) positions of the a temporally co-located PU 202.

To choose the co-located temporal merging candidate, the co-located temporal motion data from the bottom-right TMD position (see 3 (BR) in FIG. 2, outside the co-located PU 202) is first checked and selected for the temporal merging candidate if available. Otherwise, the co-located temporal motion data at the central TMD position (see 3 (CR) in FIG. 2) is checked and selected for the temporal merging candidate if available. To derive the motion data for a merging candidate from a motion data position, the needed motion data is copied from the corresponding PU which contains (or covers) the motion data position. The merging candidates in the list, if available, are ordered in the merging candidate list as numbered in FIG. 2, with the merging candidate from the left neighboring SMD position 204 placed at the beginning of the list, the temporal merging candidate from the TMD position bottom-right to or inside the co-located PU 202, in the third position, and that of the bottom-left neighboring SMD position 210 placed at the end of the list. The derivation of the spatially neighboring merging candidates, the temporal neighboring merging candidate, and the criteria for availability are explained in WD3.

A merging candidate includes motion vector information, prediction flag information, and reference picture index information for a candidate motion data position. A merging candidate may include sufficient entries to accommodate a bi-directionally predicted PU, i.e., entries for a forward motion vector, a backward motion vector, a forward reference picture index, a backward reference picture index, and a prediction flag indicating prediction direction, i.e., forward, backward, or bi-directional. The prediction flag may be composed of two prediction list utilization flags used to indicate which of two reference picture lists is to be used. Each reference picture index is an index into a respective one of the reference picture lists. For a motion data position contained by a forward predicted PU, the merging candidate entries for the prediction flag, the forward motion vector, and the forward reference picture index will be valid and the remaining entries may have placeholder values. For a motion data position contained by a backward predicted PU, the merging candidate entries for the prediction flag, the backward motion vector, and the backward reference picture index will be valid and the remaining entries may have placeholder values. For a bi-directionally predicted PU, all merging candidate entries will be valid.

In HEVC, the merging candidate entries may be referred to according to their correspondence with one of two reference picture lists, list 0 and list 1. Thus, the forward motion vector may be referred to as the list 0 (or L0) motion vector, the backward motion vector may be referred to as the list 1 (or L1) motion vector, the two prediction list utilization flags be referred to as the list 0 (or L0) prediction list utilization flag and the list 1 (or L1) prediction list utilization flag, and the reference picture indices may be referred to as the list 0 (or L0) reference picture index and the list 1 (or L1) reference picture index.

After the merging candidate list is formed, a pruning process is carried out to remove any duplicated merging candidates. If two or more merging candidates have the same motion vector(s), prediction direction, and reference picture index (or indices), the lowest order duplicated merging candidate is retained in the list and the others are removed. If all the merging candidates are not valid, zero motion vector merging candidates are added to the merging candidate list. Therefore, the merging candidate list size for merge mode may be of size 1, 2, 3, 4 or 5. Invalidity of a merging candidate for merge mode is explained in WD3.

In general, skip mode allows the encoder to "skip" coding of an inter-predicted CU when it can be effectively inter-predicted from motion data of a neighboring PU or a temporally co-located CU. More specifically, skip mode allows an inter-predicted CU to inherit the motion data of a spatial or temporal neighbor, and no non-zero quantized transform coefficients are encoded for the CU. Skip mode is determined at the CU level and is essentially a merge mode at the CU-level without non-zero transform coefficients. Thus, for skip mode, the encoder generates a merging candidate list as previously described except that the current PU is a CU. The same relative positions for the spatial merging candidates and the temporal merging candidate are used. A merging candidate for skip mode also contains the same information as previously described for a merging candidate.

In general, for direct or normal inter-prediction, motion vector(s) of a PU is (are) predicatively coded relative to a motion vector predictor(s) (MVP(s)) from an advanced motion vector predictor (AMVP) candidate list constructed by the encoder. For single direction inter-prediction of a PU, the encoder generates a single AMVP candidate list. For bi-directional prediction of a PU, the encoder generates two AMVP candidate lists, one using motion data of spatial and temporal neighboring PUs from the forward prediction direction and one using motion data of spatial and temporal neighboring PUs from the backward prediction direction.

Figure 3:
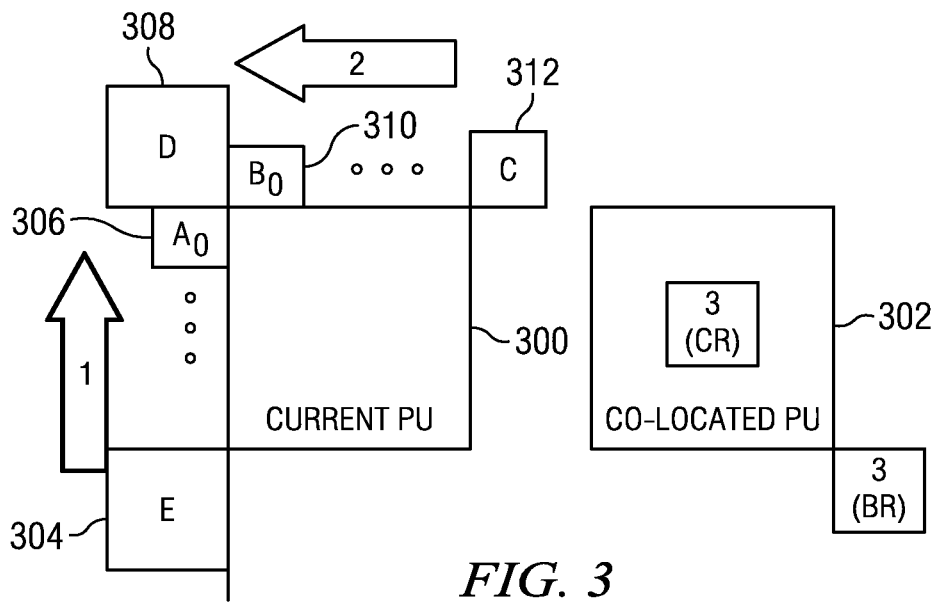
FIG. 3 is a block diagram of illustrating prior art spatial and temporal motion data positions for constructing an advanced motion vector predictor (AMVP) candidate list.

FIG. 3 illustrates the formation of an AMVP candidate list for the current PU 300 as defined in WD3. The encoder forms an AMVP candidate list based on neighboring SMD positions and TMD positions of a co-located PU 302 as illustrated in the example of FIG. 3. The motion vectors for a motion data position are selected as an MVP from the motion data of the corresponding PU which contains (covers) the motion data position. For the spatial MVP candidate derivation, the SMD positions to the left of the current PU 300 are scanned bottom up, e.g., from the bottom left SMD position 304 to the left top SMD position 306, and the motion vector of the first SMD position on the left side having available motion data is chosen to be the first candidate MVP for the AMVP candidate list. Then, the upper side neighboring SMD positions are scanned left to right, e.g., from the top right SMD position 312, through the left top SMD position 310, ending with the top left SMD position 308. The motion vector of the first SMD position on the upper neighboring side having available motion data with a motion vector of a different value from the first candidate MVP is chosen as the second candidate MVP in the AMVP candidate list. If no spatial MVP candidate is found during the scan of the left-side SMD positions, then up to two MVP candidates may be selected from the top-side SMD positions. That is, the first available motion vector of the upper left side is chosen as the first candidate MVP in the AMVP candidate list and the second available motion vector different from the first is chosen as the second candidate MVP in the AMVP candidate list.

To chose the temporal candidate MVP, the availability of motion data from the bottom-right TMD position of the co-located PU 302 (see 3 (BR) in FIG. 3, outside the co-located PU 202) is first checked and the motion vector selected for the temporal candidate MVP if available. Otherwise, the availability of motion data at the central TMD position of the co-located PU 302 (see 3 (CR) in FIG. 3) is checked and the motion vector selected for the temporal candidate MVP if available. Note that this is essentially the same derivation process as that used to select the temporal merging candidate in the merging candidate list derivation process. The temporal MVP candidate is added to the AMVP candidate list in the third position. The derivation of the spatial MVP candidates, the temporal MVP candidate, and the criteria for availability for the AMVP candidate list are explained in WD3.

If no candidate MVPs are found in the scans of the left/upper SMD positions and from co-located temporal PU, a zero MVP is added to the AMVP candidate list. After the AMVP candidate list is formed, a pruning process similar to that used in pruning the merging candidate list is carried out to remove any duplicated MVP candidates. Therefore, the AMVP candidate list size may be 1, 2, or 3.

Figure 4:
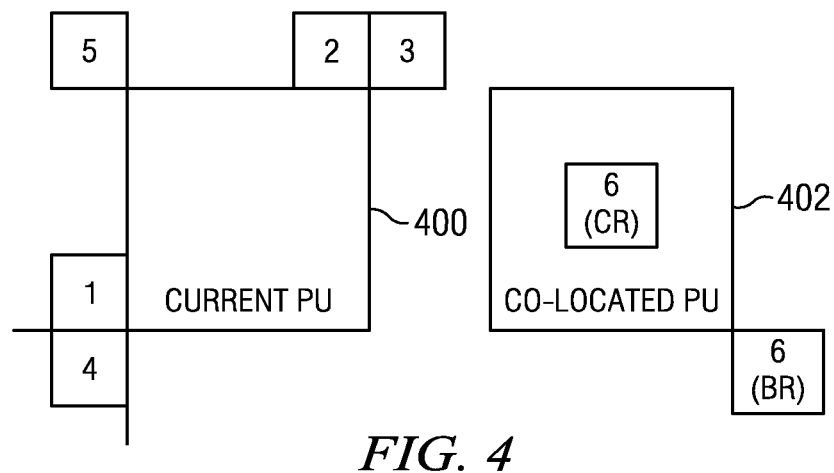
FIG. 4 is a block diagram illustrating spatial and temporal motion data positions for constructing a merging candidate list and an AMVP candidate list.

In WD4, WD5, and HEVC Draft 6, the derivation of the merging candidate list and the AMVP candidate list was changed to use the same SMD positions in constructing each list. The co-located PU and the relative TMD positions remained the same. FIG. 4 shows the five SMD positions of the current PU 400 and the temporally co-located PU 402. For the merging candidate list, the merging candidates, if available, are ordered in the list as per the numbering in FIG. 4. For the AMVP candidate list, the MVPs of the motion data positions, if available, are ordered in the list as per the numbering in FIG. 4. Pruning of the lists and the addition of zero motion vector merging candidates or zero MVPs to the respective lists is as previously described. The derivation of the spatial candidates, the temporal candidate, and the criteria for availability for each list are explained in WD4, WD5, and HEVC Draft 6.

In general, for a CU, the encoder generates a merging candidate list for skip mode, a merging candidate list for each PU in the CU, and one or two AMVP candidate lists for each PU in the CU. The encoder then uses the best candidates in each list in the determination of rate/distortion (RD) costs for using each mode. For each PU, the encoder selects the better mode between merge and normal inter-predicted mode based on the RD costs. The sum of the costs for the selected modes for all PUs in the CU is the RD cost for the CU for inter-predicted mode, i.e., non-skipped and non-intra coded mode. At the CU level, the encoder chooses the best mode among skip mode, inter-predicted mode, and Intra-predicted mode based on the RD costs of each.

For each inter-predicted CU, the encoder encodes a skip flag into the bit stream to signal whether or not the current CU is coded with skip mode. If skip mode is used, the encoder also encodes the index in the merging candidate list generated for skip mode of the merging candidate selected (unless there is only one entry in the list). If skip mode is not used for the CU and intra-prediction is not selected, the encoder encodes a merge flag into the bit stream for each inter-predicted PU of the CU to signal whether or not the merge mode is used for the PU. If merge mode is used, the encoder also encodes the index in the merging candidate list of the merging candidate selected for merging (unless there is only one entry in the list). If merge mode is not used, the encoder encodes the normal inter-prediction information for the PU in the bit-stream such as an index (or indices) into the AMVP candidate list(s) for the MVP candidate(s) selected for differential encoding of the motion vector(s), prediction direction(s), motion vector differences (MVDs), and the reference picture index (or indices).

The decoder is also required to construct a merging candidate list, and/or up to two AMVP candidate lists when decoding an inter-predicted PU, depending upon which mode was used for inter-prediction in the encoder, and a merging candidate list for an inter-predicted CU when skip mode was used by the encoder. The construction of these lists is the same as that performed in the encoder.

Figure 5:
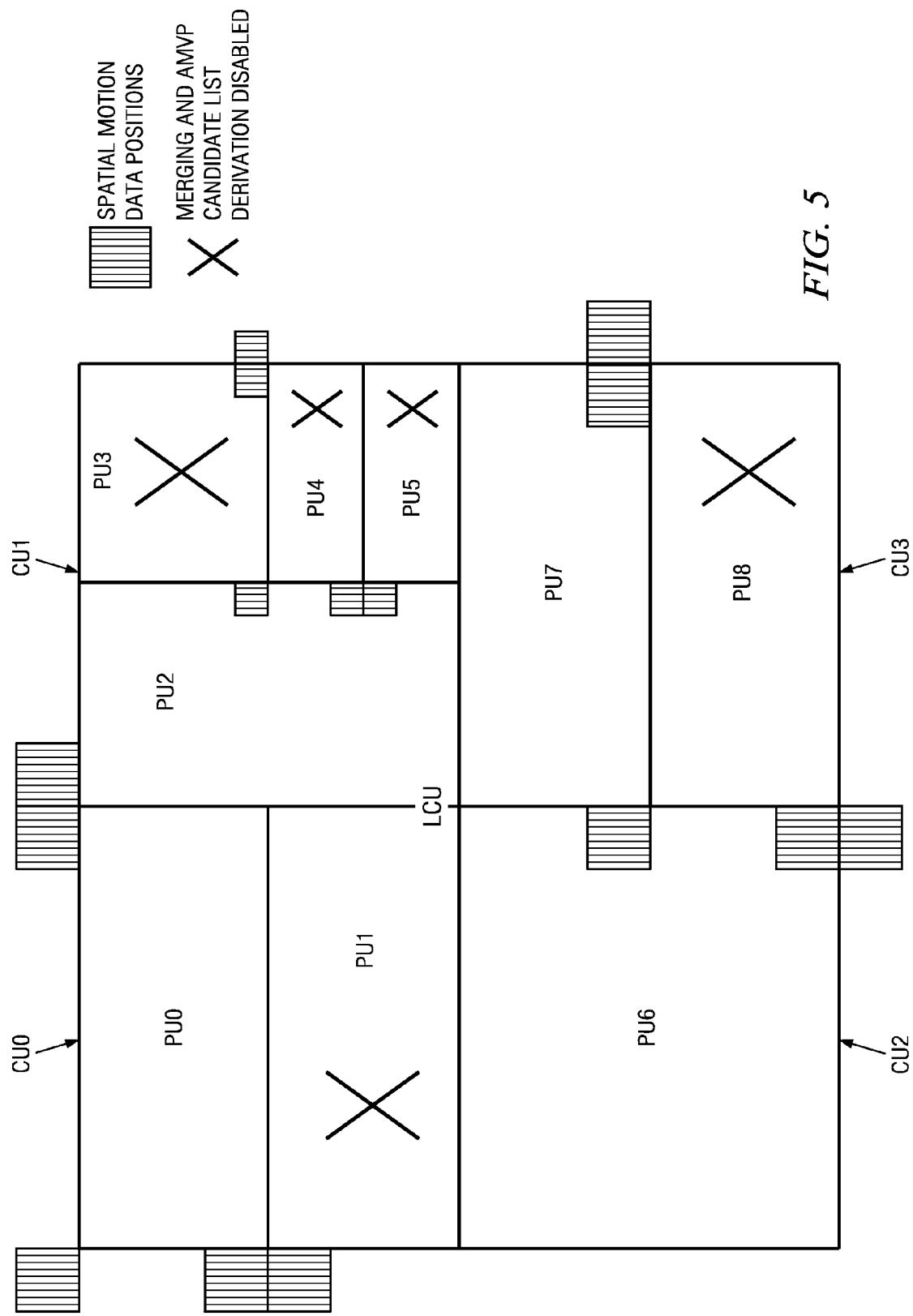
FIG. 5 is an example LCU decomposition showing spatial motion data (SMD) positions for some PUs.

The generation of the merging candidate list and the AMVP candidate list are highly sequential because of dependency on the motion data from the spatial motion data positions. Consider the example of FIG. 5. In this example, an LCU is divided into four CUs, and CU0, CU1, and CU3 are further divided into PUs. Spatial motion data positions corresponding to those of FIG. 4 are shown for PU0, PU4, and PU8. Other PUs will also have spatial motion data positions but these are omitted for simplicity. The derivation of a merging candidate list or an AMVP candidate list for PU4, for example, should consider the motion data for the positions from PU2 and PU3. Similarly, for PU8, the motion data for the positions from PU6 and PU7 should be considered. This dependency on motion data from positions in other PUs creates difficulty for parallel motion estimation in the encoder.

More specifically, in many video encoders, the various stages involved in video encoding, e.g., motion estimation, motion compensation, mode decision, transformation, quantization, and entropy coding, are performed in a pipeline fashion. That is, at any point in time, one or more blocks of video data are being processed concurrently at each stage. For example, in many embedded systems supporting video processing, there may be one master processor and one or more slave processing modules, e.g., hardware accelerators. The master processor runs the main control loop for video encoding and the slave processing modules are employed to offload certain compute-intensive tasks of video encoding such as motion estimation (ME), motion compensation (MC), intra prediction mode estimation (IPE), transformation and quantization (TQ), entropy coding (EC), loop filter (LPF) and boundary strength (BS). The slave processing modules are controlled in a pipeline fashion by the master processor such that the slave processing modules operate on different blocks of a picture at any given time. That is, the slave processing modules are executed in parallel, each processing its respective block while data movement from one processor to another is serial.

In parallel motion estimation, motion estimation is performed in parallel for skip mode, merge mode, and regular or normal intra-prediction mode for multiple PUs in a CU or even for multiple CUs in a LCU. The example of FIG. 5 follows the rules for derivation of a merging candidate list or AMVP candidate list in WD4. In WD4, the derivation of the merging candidate list and AMVP candidate list is disabled in parallel motion estimation for the PUs in a CU having spatial motion data positions in the same CU. If an encoder elects to perform parallel motion estimation for the PUs in each CU (CU0, CU1, CU2 and CU3) in the LCU, then in CU0, for example, only for the PU at the upper left corner of the CU0, i.e., PU0, is the encoder able to accurately test costs of merge mode and skip mode in parallel to the regular motion estimation process and have accurate motion vector costs for regular motion estimation. Note that with this parallel motion estimation, motion estimation for the PUs inside a CU is done in parallel while motion estimation from CU to CU is sequential. As is well known, the regular motion estimation process estimates motion vectors for a PU independent of neighboring PUs and the motion vectors are used if the PU is coded in regular or normal intra-prediction mode. Also note that for accurate motion vector costs, the AMVP candidate list needs to be generated.

For the other PU in CU0, i.e., PU1, the encoder will not be able to derive a merging candidate list for merge motion estimation or an AMVP candidate list for regular inter-prediction, and will use inaccurate motion vector costs for regular motion estimation because the neighboring motion data (motion vector(s), prediction direction, reference index (or indices), etc.) is not available when the motion estimation is taking place. Merge estimation tests the rate/distortion costs of merging candidates in a merging candidate list and selects the merging candidate with the least cost. Similarly, the merging candidate list and AMVP candidate list derivation are disabled for PU3, PU4 and PU5 in CU1, and PU8 in CU3 because the spatial motion data positions for these PUs are in the same respective CU. This will lead to significant quality loss because merge and skip modes have significant impact on video quality, and motion vector cost plays an important quality role in the regular motion estimation process.

Figure 6A:
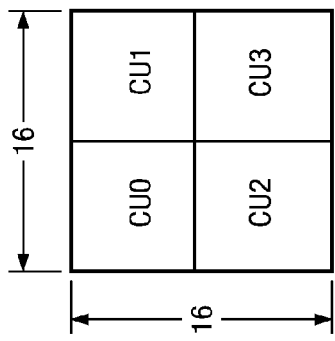
FIGS. 6A-6E illustrate parallel motion estimation timing for normal intra-prediction mode and merge mode.
Figure 6C:
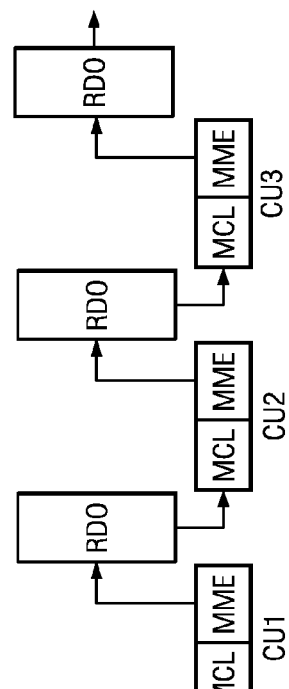

Motion estimation throughput is dictated by motion estimation for normal inter-prediction mode. Referring now to FIGS. 6A-6E, assume a 16×16 block as shown in FIG. 6A. In these figures, integer ME is motion estimation with integer-pel accuracy, SME is sub-pel motion estimation, MV is motion vector, MCL is merging candidate list derivation, MME is merge motion estimation, and RDO is rate/distortion optimization. For simplicity of explanation, it is assumed that the 16×16 block of FIG. 6A contains four CUs and each CU is also a PU.

In H.264/AVC, motion estimation for both skip mode and regular motion prediction may be performed in parallel for the entire block. That is, in H.264/AVC, the skip motion vector derivation and skip search for skip mode are on a 16×16 block level and can be fully parallelized with the regular motion estimation (ME). This is shown in the AVC ME timing diagram of FIG. 6B.

In HEVC, the 16×16 block may be divided into CUs as shown in FIG. 6A. Thus, quality is improved because not only 16×16 block level but also sub-16×16 level merge/skip mode and regular motion prediction is supported by the standard. However, because of the inter-dependency of the spatial motion data positions in the merging candidate list (MCL) derivation, for the best quality to be achieved, only the MCL derivation and merge motion estimation (MME) of the first 8×8 CU, i.e., CU0 of FIG. 6A, can execute in parallel to the regular ME. The MCL derivation and MME of the other CUs are then executed sequentially after the regular ME is completed, thus incurring additional cycles. Therefore, to exploit the full quality potential of HEVC, an HEVC encoder needs more time to complete the motion estimation. This is shown in the HEVC ME timing diagram of FIG. 6C. Similarly, for regular motion estimation, only the AMVP candidate list derivation for the first 8×8 CU, i.e., CU0, can be performed in parallel. Thus, accurate motion vector cost can be computed only for the 8×8 CU0 and the remainder of the CUs in the 16×16 block will use inaccurate motion vector cost for regular motion estimation.

Figure 6D:
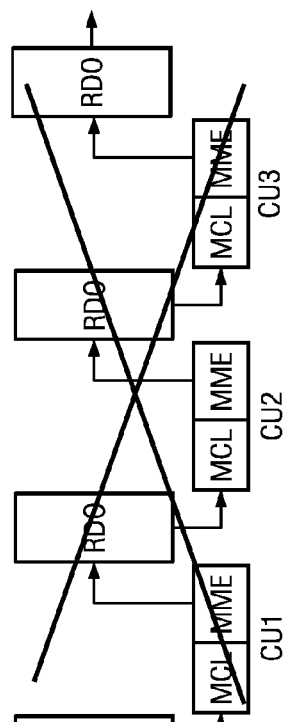
Figure 6B:
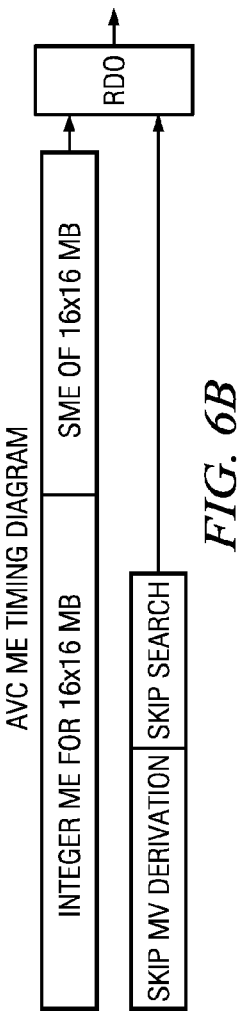
Figure 6E:
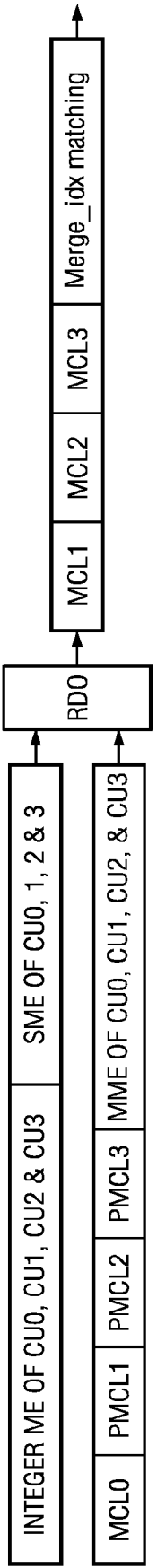

FIGS. 6D and 6E are timing diagrams of two architectures that have been proposed to quantify the quality loss in HEVC when using parallel motion estimation (PME), HEVC PME A and HEVC PME B. In HEVC PME A, an encoder can skip MCL derivation and MME for those PUs/CUs in which MCL derivation is affected by the PME constraints (those CUs and PUs are called affected PUs/CUs hereafter). This approach causes quality loss but increases the throughput. The timing diagram of FIG. 6D illustrates this approach. Referring back to the example of FIG. 5, with this approach, MCL derivation and AMVP candidate list derivation would be skipped for PU1, PU3, PU4, PU5, and PU8.

In HEVC PME B, instead of simply skipping MCL/MME for affected PUs/CUs, an encoder constructs a partial MCL (PMCL) for the affected PUs/CUs with available motion data from spatial motion data positions, and enables MME for the affected PUs/CUs using the partial MCLS. In this architecture, RDO accuracy for MME of the affected PUs/CUs is reduced due to the partial MCLS, which also causes quality loss. In addition, accurate MCL derivation and merging candidate index (merge_idx) matching needs to be performed for merging candidate index coding. This requires extra logic and cycles, and may be performed outside the ME engine in a pipelined architecture because of ME cycle constraints. The timing diagram of FIG. 6E illustrates this approach. Similar to FIG. 6C, for regular motion estimation, only the AMVP candidate list derivation for the first 8×8 CU, i.e., CU0, can be performed in parallel. Thus, accurate motion vector cost can be computed only for the 8×8 CU0 and the remainder of the CUs in the 16×16 block will use inaccurate motion vector cost for regular motion estimation.

Embodiments of the invention provide for decoupling the merging candidate list construction and motion estimation for merge mode and skip mode and the AMVP candidate list construction from regular motion estimation to increase the coding quality in PME while meeting throughput requirements. This decoupling is accomplished by modifying the availability rules for spatial motion data positions for merging candidate list and AMVP candidate list construction. In some embodiments, an LCU is divided into non-overlapping parallel motion estimation regions (PMER) of equal size. The size of a PMER may be configurable and may be signaled in high-level syntax such as in a picture parameter set (PPS). From PMER to PMER, the motion estimation is sequential, i.e., motion estimation is performed on the next PMER after the motion estimation on the current PMER is finished. Within a PMER, motion estimation for merge mode, skip mode, and normal inter-prediction mode may be performed in parallel for all the PUs in the PMER. In some embodiments, the spatial motion data positions inside the same PMER as the current PU are considered to be unavailable in the merging candidate list and AMVP list construction process. In some embodiments, if a spatial motion data position is in the same PMER as the current PU, an alternative spatial motion data position just outside the PMER of the current PU is considered.

Figure 7:
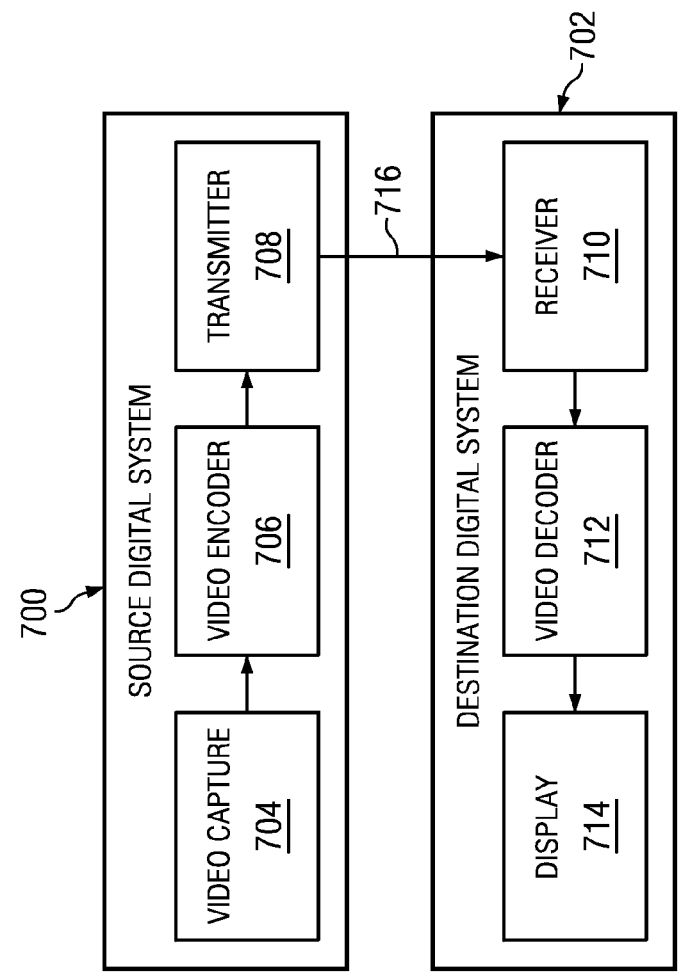
FIG. 7 is a block diagram of an example digital system.

FIG. 7 shows a block diagram of a digital system that includes a source digital system 700 that transmits encoded video sequences to a destination digital system 702 via a communication channel 716. The source digital system 700 includes a video capture component 704, a video encoder component 706, and a transmitter component 708. The video capture component 704 is configured to provide a video sequence to be encoded by the video encoder component 706. The video capture component 704 may be, for example, a video camera, a video archive, or a video feed from a video content provider. In some embodiments, the video capture component 704 may generate computer graphics as the video sequence, or a combination of live video, archived video, and/or computer-generated video.

The video encoder component 706 receives a video sequence from the video capture component 704 and encodes it for transmission by the transmitter component 708. The video encoder component 706 receives the video sequence from the video capture component 704 as a sequence of pictures, divides the pictures into largest coding units (LCUs), and encodes the video data in the LCUs. The video encoder component 706 may be configured to perform merging candidate list and AMVP candidate list derivation during the encoding process as described herein. An example of the video encoder component 706 is described in more detail herein in reference to FIG. 8.

The transmitter component 708 transmits the encoded video data to the destination digital system 702 via the communication channel 716. The communication channel 716 may be any communication medium, or combination of communication media suitable for transmission of the encoded video sequence, such as, for example, wired or wireless communication media, a local area network, or a wide area network.

The destination digital system 702 includes a receiver component 710, a video decoder component 712 and a display component 714. The receiver component 710 receives the encoded video data from the source digital system 700 via the communication channel 716 and provides the encoded video data to the video decoder component 712 for decoding. The video decoder component 712 reverses the encoding process performed by the video encoder component 706 to reconstruct the LCUs of the video sequence. The video decoder component 712 may be configured to perform to perform merging candidate list and AMVP candidate list derivation during the decoding process as described herein. An example of the video decoder component 712 is described in more detail below in reference to FIG. 9.

The reconstructed video sequence is displayed on the display component 714. The display component 714 may be any suitable display device such as, for example, a plasma display, a liquid crystal display (LCD), a light emitting diode (LED) display, etc.

In some embodiments, the source digital system 700 may also include a receiver component and a video decoder component and/or the destination digital system 702 may include a transmitter component and a video encoder component for transmission of video sequences both directions for video steaming, video broadcasting, and video telephony. Further, the video encoder component 706 and the video decoder component 712 may perform encoding and decoding in accordance with one or more video compression standards. The video encoder component 706 and the video decoder component 712 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 8:
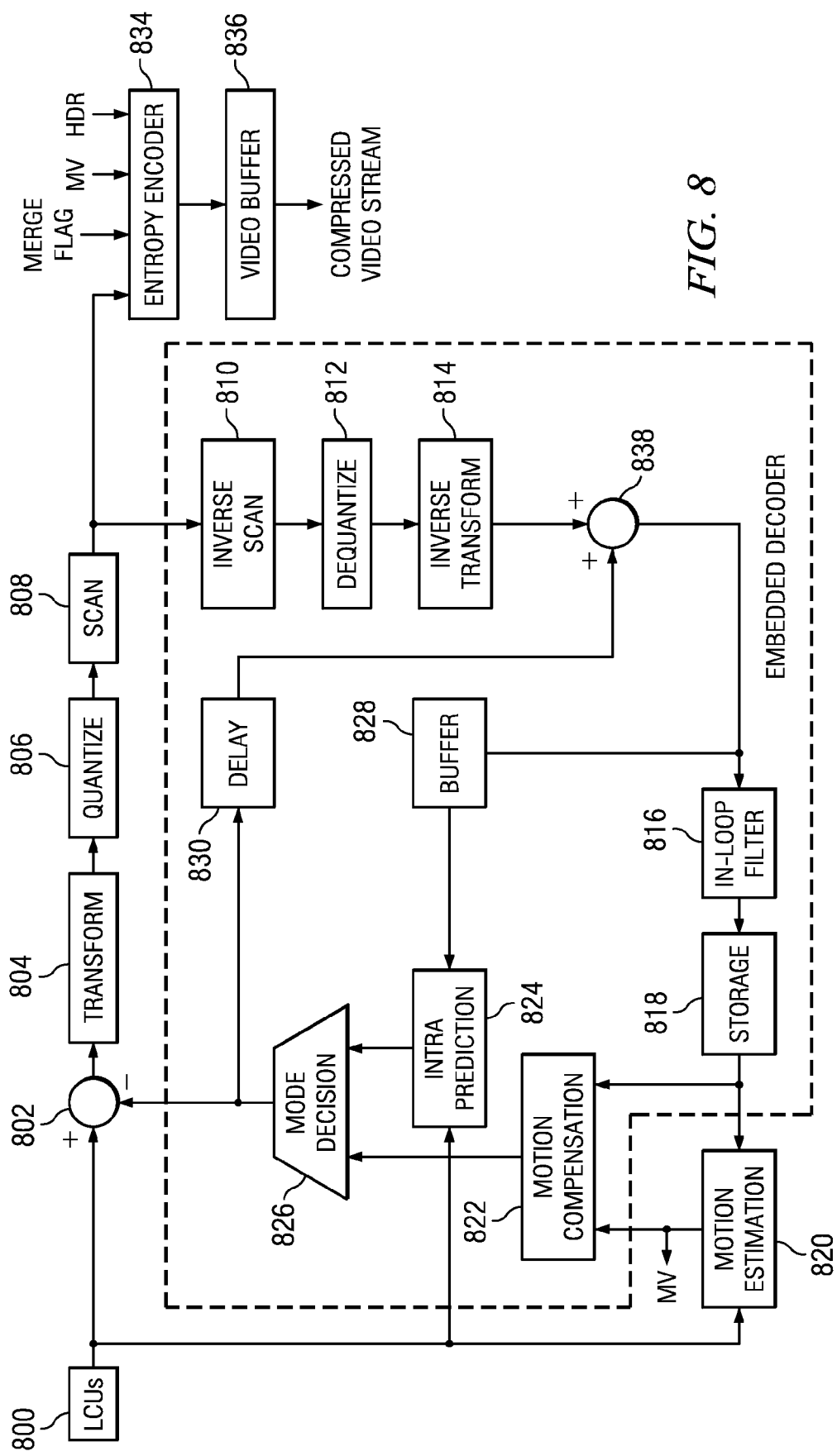
FIG. 8 is a block diagram of a video encoder.

FIG. 8 shows a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing. The coding control component also may determine the initial LCU CU structure for each CU and provides information regarding this initial LCU CU structure to the various components of the video encoder as needed. The coding control component also may determine the initial PU and TU structure for each CU and provides information regarding this initial structure to the various components of the video encoder as needed.

In addition, for pipelined architectures, the coding control component controls the processing of PUs and CUs in parallel motion estimation regions (PMERs) by the LCU processing in a pipeline fashion. That is, the coding control component may further divide each LCU in a picture into one or more non-overlapping PMERs of equal size. A PMER may have any shape but for HEVC a square shape is recommended. From PMER to PMER, the motion estimation is sequential, i.e., motion estimation is performed on the next PMER after the motion estimation on the current PMER is completed. Within a PMER, motion estimation for merge mode, skip mode, and normal inter-prediction mode is performed in parallel for all the PUs and CUs in the PMER.

Figure 11:
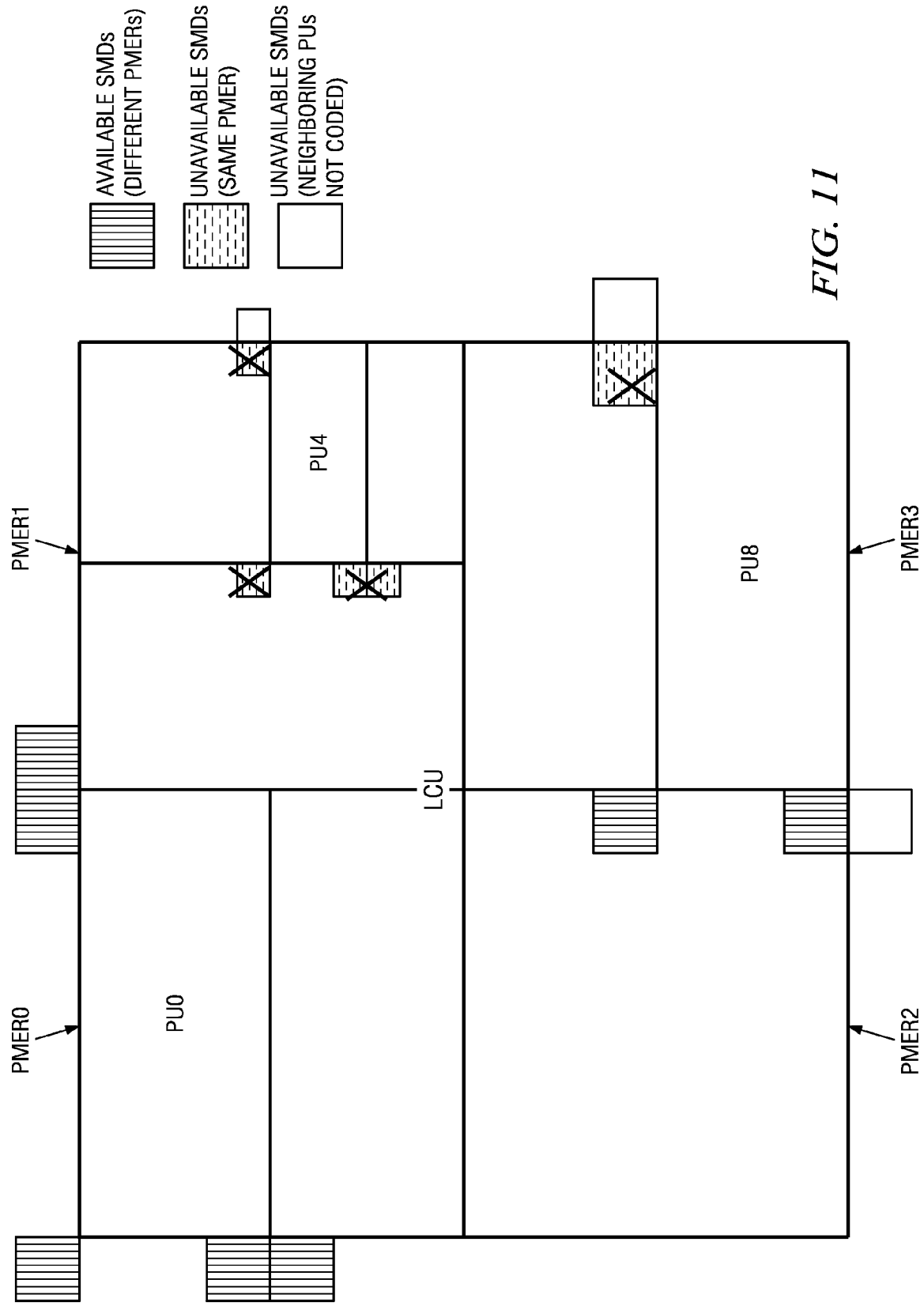
FIGS. 11 and 14 are example LCU decompositions into parallel motion estimation regions (PMERs) showing example spatial motion data positions for PUs.
Figure 13:
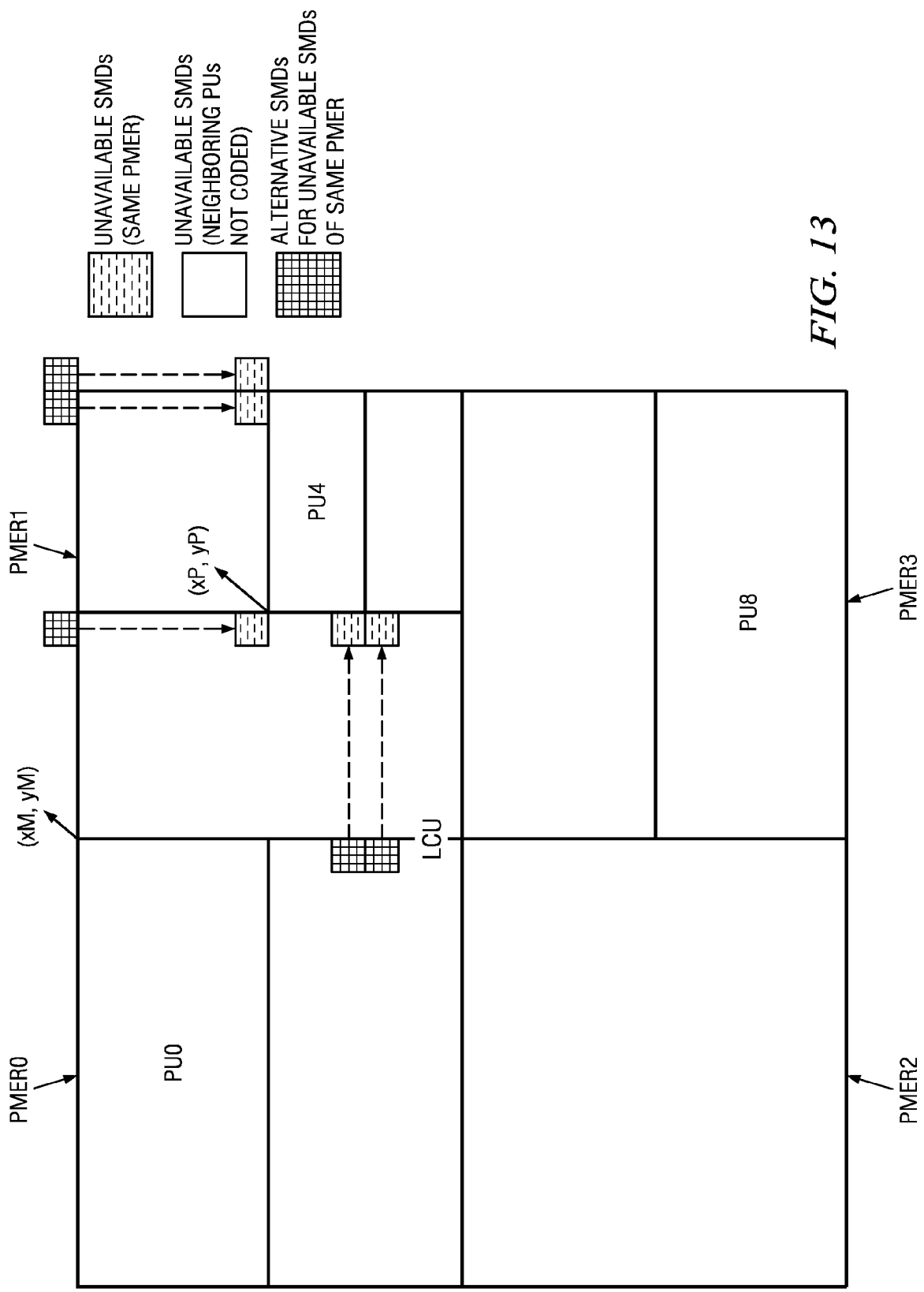
FIG. 13 is an example illustrating upper left corner luminance coordinate positions for a PU and a parallel motion estimation region.

In some embodiments, the size of a PMER is configurable and may be signaled in the picture parameter set (PPS) for a picture. Table 1 shows example PMER sizes and flag values that may be used. FIGS. 11 and 13 show examples of an LCU divided into four square PMERs.

TABLE 1

| PMER Signal Value | PMER Size | Remark |
| --- | --- | --- |
| 0 | 4 × 4 | Sequential motion estimation for all PUs in a LCU because minimum PU size allowed is 4 × 4 |
| 1 | 8 × 8 | Parallel motion estimation allowed for 8 × 8 block-level |
| 2 | 16 × 16 | Parallel motion estimation allowed at 16 × 16 block-level |
| 3 | 32 × 32 | Parallel motion estimation allowed at 32 × 32 block-level |
| 4 | 64 × 64 | Parallel motion estimation allowed at 64 × 64 block-level |

The LCU processing receives LCUs of the input video sequence from the coding control component and encodes the LCUs under the control of the coding control component to generate the compressed video stream. The CUs in the CU structure of an LCU may be processed by the LCU processing in a depth-first Z-scan order. The LCUs 800 from the coding control unit are provided as one input of a motion estimation component 820, as one input of an intra-prediction component 824, and to a positive input of a combiner 802 (e.g., adder or subtractor or the like). Further, although not specifically shown, the prediction mode of each picture as selected by the coding control component is provided to a mode selector component and the entropy encoder 834.

The storage component 818 provides reference data to the motion estimation component 820 and to the motion compensation component 822. The reference data may include one or more previously encoded and decoded CUs, i.e., reconstructed CUs.

The motion estimation component 820 provides motion data information to the motion compensation component 822 and the entropy encoder 834. More specifically, the motion estimation component 820 performs tests on CUs in an LCU based on multiple inter-prediction modes (e.g., skip mode, merge mode, and normal or direct inter-prediction) and transform block sizes using reference picture data from storage 818 to choose the best motion vector(s)/prediction mode based on a rate distortion coding cost. To perform the tests, the motion estimation component 820 may begin with the CU structure provided by the coding control component. The motion estimation component 820 may divide each CU indicated in the CU structure into PUs according to the unit sizes of prediction modes and into transform units according to the transform block sizes and calculate the coding costs for each prediction mode and transform block size for each CU. The motion estimation component 820 may also compute CU structure for the LCU and PU/TU partitioning structure for a CU of the LCU by itself.

As mentioned above, the prediction modes considered by the motion estimation component 820 may be merge mode, skip mode, and regular (normal) inter-prediction mode. To consider skip mode, the motion estimation component 820 constructs a skip mode merging candidate list at the CU level. To consider merge mode, the motion estimation component 820 constructs a merging candidate list for each PU in the CU. To consider regular inter-prediction mode, the motion estimation component 820 estimates motion vectors and constructs one or two AMVP candidate lists (depending on prediction direction) for each PU. Construction of a merging candidate list and an AMVP candidate list may be performed as per methods for inter-prediction candidate list construction described herein.

For each PU of a CU, the motion estimation component 820 computes coding costs for each entry in the merging candidate list and selects the entry with the best result. The coding cost of this entry is used by the motion estimation component 820 in prediction mode selection. For each PU of the CU, the motion estimation component 820 determines the best motion vectors and MVP(s) from the AMVP candidate list(s) based on coding costs, and uses the best coding cost for prediction mode selection. For each PU in the CU, the motion estimation component selects the better of merge mode and normal inter-predicted mode based on the coding costs. The sum of the costs of the selected modes for all PUs in the CU is the RD cost for the CU in inter-predicted mode. For the CU, the motion estimation component 820 also computes coding costs for each entry in the skip mode merging candidate list and selects the entry with the best result. The coding cost of this entry is used by the motion estimation component 820 in prediction mode selection between CU-level skip mode and normal inter-predicted mode.

For coding efficiency, the motion estimation component 820 may also decide to alter the CU structure by further partitioning one or more of the CUs in the CU structure. That is, when choosing the best motion vectors/prediction modes, in addition to testing with the initial CU structure, the motion estimation component 820 may also choose to divide the larger CUs in the initial CU structure into smaller CUs (within the limits of the recursive quadtree structure), and calculate coding costs at lower levels in the coding hierarchy. If the motion estimation component 820 changes the initial CU structure, the modified CU structure is communicated to other components that need the information.

The motion estimation component 820 provides the selected motion vector (MV) or vectors and the selected prediction mode for each inter-predicted PU of a CU to the motion compensation component 822 and the selected motion vector (MV), reference picture index (indices), prediction direction (if any) to the entropy encoder 834. If merge mode or skip mode provides the best motion vector(s)/prediction mode for a PU or CU based on a coding cost, the motion estimation component 820 also indicates to the entropy encoder 834 to encode a merge (skip) flag indicating that merge (skip) mode is used for a PU (CU) and to encode an index into the merging candidate list for the entry that provided the best coding cost. The index may not be encoded if the candidate list size is one; instead it is inferred to be 0.

If merge mode did not provide the best coding cost for an inter-predicted PU, the motion estimation component 820 indicates to the entropy encoder 834 to encode a merge flag indicating that merge mode was not used for the PU. A merge flag is encoded for each inter-predicted PU unless skip mode is selected for the CU containing the PU. Further, if normal inter-prediction mode provided the best coding cost, the motion estimation component 820 indicates to the entropy encoder 834 to encode an index (or indices) into the AMVP candidate list(s) for the MVP candidate(s) used for differential prediction of the motion vector(s).

The motion compensation component 822 provides motion compensated inter-prediction information to the mode decision component 826 that includes motion compensated inter-predicted PUs, the selected inter-prediction modes for the inter-predicted PUs, and corresponding transform block sizes. The coding costs of the inter-predicted PUs are also provided to the mode decision component 826.

The intra-prediction component 824 provides intra-prediction information to the mode decision component 826 that includes intra-predicted PUs and the corresponding intra-prediction modes. That is, the intra-prediction component 824 performs intra-prediction in which tests based on multiple intra-prediction modes and transform unit sizes are performed on CUs in an LCU using previously encoded neighboring PUs from the buffer 828 to choose the best intra-prediction mode for each PU in the CU based on a coding cost. To perform the tests, the intra-prediction component 824 may begin with the CU structure provided by the coding control. The intra-prediction component 824 may divide each CU indicated in the CU structure into PUs according to the unit sizes of the intra-prediction modes and into transform units according to the transform block sizes and calculate the coding costs for each prediction mode and transform block size for each PU.

For coding efficiency, the intra-prediction component 824 may also decide to alter the CU structure by further partitioning one or more of the CUs in the CU structure. That is, when choosing the best prediction modes, in addition to testing with the initial CU structure, the intra-prediction component 824 may also chose to divide the larger CUs in the initial CU structure into smaller CUs (within the limits of the recursive quadtree structure), and calculate coding costs at lower levels in the coding hierarchy. If the intra-prediction component 824 changes the initial CU structure, the modified CU structure is communicated to other components that need the information. Further, the coding costs of the intra-predicted PUs and the associated transform block sizes are also provided to the mode decision component 826.

The mode decision component 826 selects between the motion-compensated inter-predicted PUs from the motion compensation component 822 and the intra-predicted PUs from the intra-prediction component 824 based on the coding costs of the PUs and the picture prediction mode provided by the mode selector component. The decision is made at CU level. Based on the decision as to whether a CU is to be intra- or inter-coded, the intra-predicted PUs or inter-predicted PUs are selected, accordingly. The output of the mode decision component 826, i.e., the predicted PU, is provided to a negative input of the combiner 802 and to a delay component 830. The associated transform block size is also provided to the transform component 804. The output of the delay component 830 is provided to another combiner (i.e., an adder) 838. The combiner 802 subtracts the predicted PU from the current PU to provide a residual PU to the transform component 804. The resulting residual PU is a set of pixel difference values that quantify differences between pixel values of the original PU and the predicted PU. The residual blocks of all the PUs of a CU form a residual CU block for the transform component 804.

The transform component 804 performs block transforms on the residual CU to convert the residual pixel values to transform coefficients and provides the transform coefficients to a quantize component 806. The transform component 804 receives the transform block sizes for the residual CU and applies transforms of the specified sizes to the CU to generate transform coefficients.

The quantize component 806 quantizes the transform coefficients based on quantization parameters (QPs) and quantization matrices provided by the coding control component and the transform sizes. The quantized transform coefficients are taken out of their scan ordering by a scan component 808 and arranged by significance, such as, for example, beginning with the more significant coefficients followed by the less significant.

The ordered quantized transform coefficients for a CU provided via the scan component 808 along with header information for the CU are coded by the entropy encoder 834, which provides a compressed bit stream to a video buffer 836 for transmission or storage. The header information may include the prediction mode used for the CU. If the CU uses merge mode, and all the transform coefficients after quantization are all zero, the CU is coded with skip mode, a skip flag equal to one is encoded into bit stream, and an index into the merging candidate list for the merging candidate used for the skip mode is also encoded unless the size of the merging candidate list is one. Otherwise, a merge flag is encoded for each PU of the CU unless the CU is intra-coded. Further, if merge mode is the actual mode selected for prediction of a PU, an index into the merging candidate list for the merging candidate used for prediction of the PU is also encoded unless the size of the merging candidate list is one. Otherwise, if a PU is encoded with normal or regular inter-predicted mode, motion data for the PU, including motion vector difference, reference picture index (indices), prediction direction flag, and an index (two indices) into the AMVP candidate lists for the PU, is encoded into bit stream. The entropy encoder 834 also encodes the CU and PU structure of each LCU.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures. To determine the reconstructed input, i.e., reference data, the ordered quantized transform coefficients for a CU provided via the scan component 808 are returned to their original post-transform arrangement by an inverse scan component 810, the output of which is provided to a dequantize component 812, which outputs a reconstructed version of the transform result from the transform component 804.

The dequantized transform coefficients are provided to the inverse transform component 814, which outputs estimated residual information which represents a reconstructed version of a residual CU. The inverse transform component 814 receives the transform block size used to generate the transform coefficients and applies inverse transform(s) of the specified size to the transform coefficients to reconstruct the residual values.

The reconstructed residual CU is provided to the combiner 838. The combiner 838 adds the delayed selected CU to the reconstructed residual CU to generate an unfiltered reconstructed CU, which becomes part of reconstructed picture information. The reconstructed picture information is provided via a buffer 828 to the intra-prediction component 824 and to an in-loop filter component 816. The in-loop filter component 816 applies various filters to the reconstructed picture information to improve the reference picture used for encoding/decoding of subsequent pictures. The in-loop filter component 816 may, for example, adaptively apply low-pass filters to block boundaries according to the boundary strength to alleviate blocking artifacts causes by the block-based video coding. The filtered reference data is provided to storage component 818.

Figure 9:
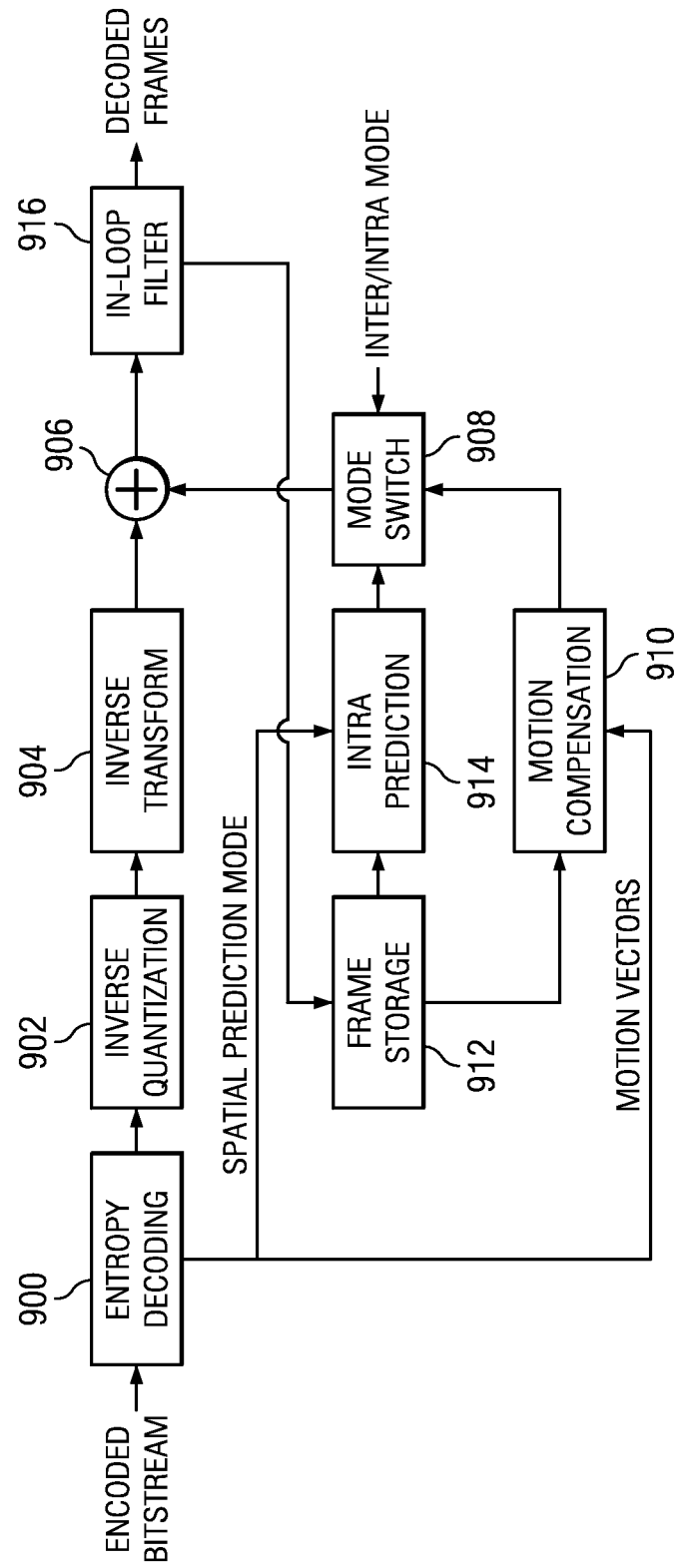
FIG. 9 is a block diagram of a video decoder.

FIG. 9 shows a block diagram of an example video decoder. The video decoder operates to reverse the encoding operations, i.e., entropy coding, quantization, transformation, and prediction, performed by the video encoder of FIG. 8 to regenerate the pictures of the original video sequence. In view of the above description of a video encoder, one of ordinary skill in the art will understand the functionality of components of the video decoder without detailed explanation.

The entropy decoding component 900 receives an entropy encoded (compressed) video bit stream and reverses the entropy coding to recover the encoded PUs and header information such as the prediction modes and the encoded CU and PU structures of the LCUs, skip flags, merge flags, merge indices, etc. For each encoded picture, the entropy decoding component 900 may decode a flag indicating a PMER size from the picture parameter set. For each inter-predicted PU, unless skip mode is indicated, the entropy decoding component 900 decodes a merge flag from the bit stream. If the merge flag indicates that merge mode was not selected for the PU, the entropy decoding component 900 constructs an AMVP candidate list(s) for the PU and decodes a reference picture index (or indices), MVDs (motion vector difference), and an index (or indices) into the AMVP candidate list for the PU. Construction of an AMVP candidate list may be performed as per methods for inter-prediction candidate list construction described herein. The entropy decoder 900 then reconstructs the motion vector(s) according to the indicated AMVP candidate(s) and the decoded MVDs and provides the motion vector(s) and reference picture index (or indices) to the motion compensation component 910.

If the merge flag indicates that merge mode was used for the PU in the encoder, the entropy decoding component 900 constructs a merging candidate list for the PU and decodes an index into the merging candidate list from the bit stream, if the index is in the bit stream. If no index is present, the index is assumed to be zero. Construction of a merging candidate list may be performed as per methods for inter-prediction candidate list construction described herein. The entropy decoder provides the motion vector(s) and reference picture index (or indices) from the indicated merging candidate in the merging candidate list to the motion compensation component 910.

If skip mode is indicated, the entropy decoding component 900 constructs a merging candidate list for the CU and decodes an index into the merging candidate list from the bit stream, if the index is in the bit stream. If no index is present, the index is assumed to be zero. Construction of a merging candidate list for skip mode may be performed as per methods for inter-prediction candidate list construction described herein. The entropy decoder provides the motion vector(s) and reference picture index (or indices) from the indicated merging candidate in the merging candidate list for skip mode to the motion compensation component 910.

The inverse quantization component 902 de-quantizes the quantized transform coefficients of the residual CU. The inverse transform component 904 transforms the frequency domain data from the inverse quantization component 902 back to the residual CU. That is, the inverse transform component 904 applies an inverse unit transform, i.e., the inverse of the unit transform used for encoding, to the de-quantized residual coefficients to produce the residual CUs.

A residual CU supplies one input of the addition component 906. The other input of the addition component 906 comes from the mode switch 908. When an inter-prediction mode is signaled in the encoded video stream, the mode switch 908 selects predicted PUs from the motion compensation component 910 and when an intra-prediction mode is signaled, the mode switch selects predicted PUs from the intra-prediction component 914.

The motion compensation component 910 receives reference data from storage 912 and applies the motion compensation computed by the encoder and transmitted in the encoded video bit stream to the reference data to generate a predicted PU. That is, the motion compensation component 910 uses the motion vector(s) from the entropy decoder 900 and the reference data to generate a predicted PU.

The intra-prediction component 914 receives reference data from previously decoded PUs of a current picture from the picture storage and applies the intra-prediction computed by the encoder as signaled by the intra-prediction mode transmitted in the encoded video bit stream to the reference data to generate a predicted PU.

The addition component 906 generates a decoded CU by adding the predicted PUs selected by the mode switch 908 and the residual CU. The output of the addition component 906 supplies the input of the in-loop filter component 916. The in-loop filter component 916 performs the filtering as the encoder. The output of the in-loop filter component 916 is the decoded pictures of the video bit stream. Further, the output of the in-loop filter component 916 is stored in storage 912 to be used as reference data.

Methods for construction of an inter-prediction candidate list, i.e., a merging candidate list or an AMVP candidate list, are now described. These methods may be used as in both an encoder and a decoder. For simplicity of explanation, the SMD positions, the TMD positions, and the ordering of the merging candidates in the merging candidate list and the AMVP candidate list are assumed to be as shown in FIG. 4. One of ordinary skill in the art will understand that different SMD and/or TMD positions, different derivations, and/or different ordering may be used. In these methods, the SMD availability rules for inter-prediction candidate list construction are modified from those previously mentioned herein in order to enable testing of merge mode for every PU and skip mode for every CU, and improved accuracy of motion vector cost determination for normal intra-prediction mode for parallel motion estimation.

The method descriptions assume that a PMER size has been set for a picture. The methods are described relative to a current PU for clarity of description. For skip mode, the current PU is replaced by the current CU. Using the SMD positions and TMD positions of FIG. 4, the derivation of the spatial and temporal merging candidates and the spatial and temporal MVP candidates is the same except for the amount of motion data used for a candidate, i.e., a temporal or spatial MVP candidate uses the motion vector data from the PU covering a motion data position and a spatial or temporal merging candidate uses the motion vector data and additional data from the PU covering a motion data position. For simplicity of explanation, the generic terms spatial motion data (SMD) candidate and temporal motion data (TMD) candidate are used when the description applies to both merging and MVP candidates.

Figure 10:
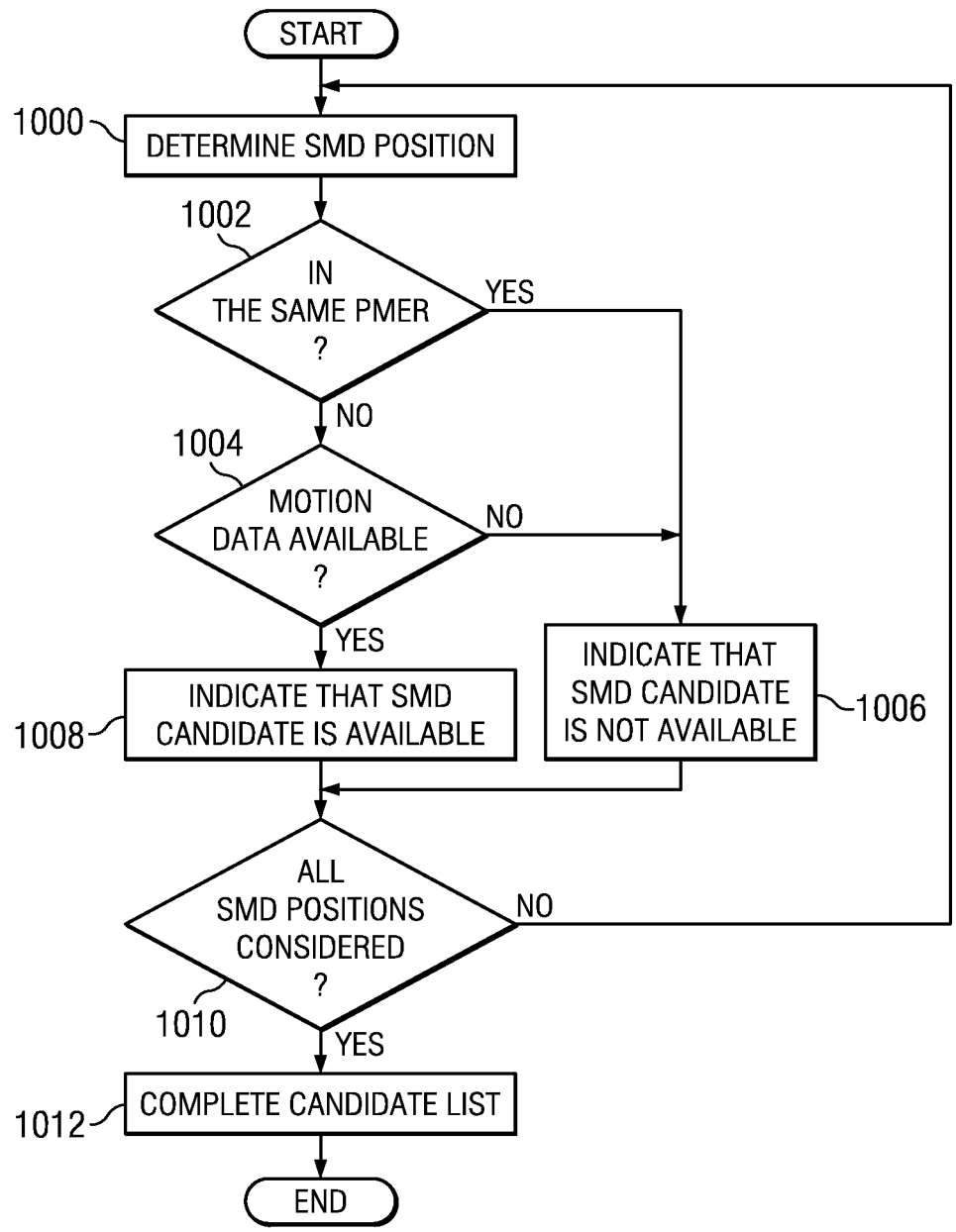
FIGS. 10 and 12 are flow diagrams of methods for intra-prediction candidate list construction in an encoder or decoder.

Referring now to the method of FIG. 10, initially an SMD position is determined 1000. The position (xN, yN) of each SMD position of FIG. 4 may be computed relative to the luminance coordinates (xP, yP) of the upper-left corner of the current PU in the current picture as per Table 2, where nPSW is the width of the current PU and nPSH is the height of the current PU.

TABLE 2

| SMD Position Index (see FIG. 4) | Position | (xN, yN) |
| --- | --- | --- |
| 1 | Left down | (xP − 1, yP + nPSH − 1) |
| 2 | Above | (xP + nPSW − 1, yP − 1) |
| 3 | Above Right | (xP + nPSW, yP − 1) |
| 4 | Left bottom | (xP − 1, yP + nPSH) |
| 5 | Above left | (xP − 1, yP − 1) |

Then, a determination is made as to whether or not the SMD position is in the same PMER as the current PU 1002. The test for whether or not an SMD position (xN, yN) is in the same PMER as a PU having the upper-left corner luminance coordinates (xP, yP) may be performed as per (((xP>>pml)==(xN>>pml)) && ((yP>>pml)==(yN>>pml)))

where pml=PMER signal value+2. See Table 1 for example PMER signal values. If both conditions are true, the SMD position is in the same PMER as the current PU.

If the SMD position is in the same PMER as the current PU 1002, an indication is set 1006 that the SMD candidate for the SMD position is not available, and the next SMD position, if any 1010, is processed. If the SMD position is not in the same PMER as the current PU 1005, the availability 1004 of motion data for the SMD position is determined. Motion data for an SMD position may not be available, for example, if the PU containing the SMD position was intra-predicted or is outside the current slice or picture or has not yet been coded. If the motion data is not available 1004, an indication is set 1006 that the SMD candidate for the SMD position is not available, and the next SMD position, if any 1010, is processed. If the motion data is available 1004, an indication is set 1008 that the SMD candidate for the SMD position is available, and the next SMD position, if any 1010, is processed.

Once all SMD positions have been considered 1010, the inter-prediction candidate list is completed 1012. Completion of the inter-prediction candidate list includes derivation of the TMD candidate, retrieving the requisite motion data for the available SMD candidates and the TMD candidate, if available, ordering the available SMD candidates and the TMD candidate, if available, in the inter-prediction candidate list as per the ordering of FIG. 4, and pruning the inter-prediction candidate list to remove duplicates.

When the inter-prediction candidate list is an AMVP candidate list, the derivation of the TMD candidate may be performed as described in WD4, WD5, and HEVC Draft 6. When the inter-prediction candidate list is a merging candidate list, an index for the reference picture to be used for deriving the TMD candidate needs to be determined. This index may be determined based on the left-down SMD position (SMD position index 1 of Table 2). If this SMD position is not in a different slice or picture, the current PU is the first PU of a CU, the PU containing the SMD position is not intra-coded, and the SMD position is not in the same PMER as the current PU, the reference picture index is set to that of the PU containing the SMD position. Otherwise, the reference picture index is set to 0. Once the reference picture index is determined, the derivation of the TMD candidate may be performed as described in WD4, WD5, and HEVC Draft 6.

FIG. 11 is an example illustrating availability of SMD positions when the method of FIG. 10 is used. In this example, an LCU is decomposed into PUs as shown and is divided into four PMERs. For PU0 in PMER0, all of the SMD candidates for the SMD positions may be available as the SMD positions are outside PMER0. For PU4 in PMER1, none of the SMD candidates for the SMD positions will be available as the SMD positions are either in PMER1 or in PUs that have not yet been coded (decoded). Only the TMD candidate may possibly be available. For PU8 in PMER3, some of the SMD candidates may be available as their SMD positions are outside PMER3 and are in PUs that have been coded (decoded) while other SMD candidates will not be available as their SMD positions are either inside PMER3 or are in PUs that have not yet been coded (decoded).

Figure 12:
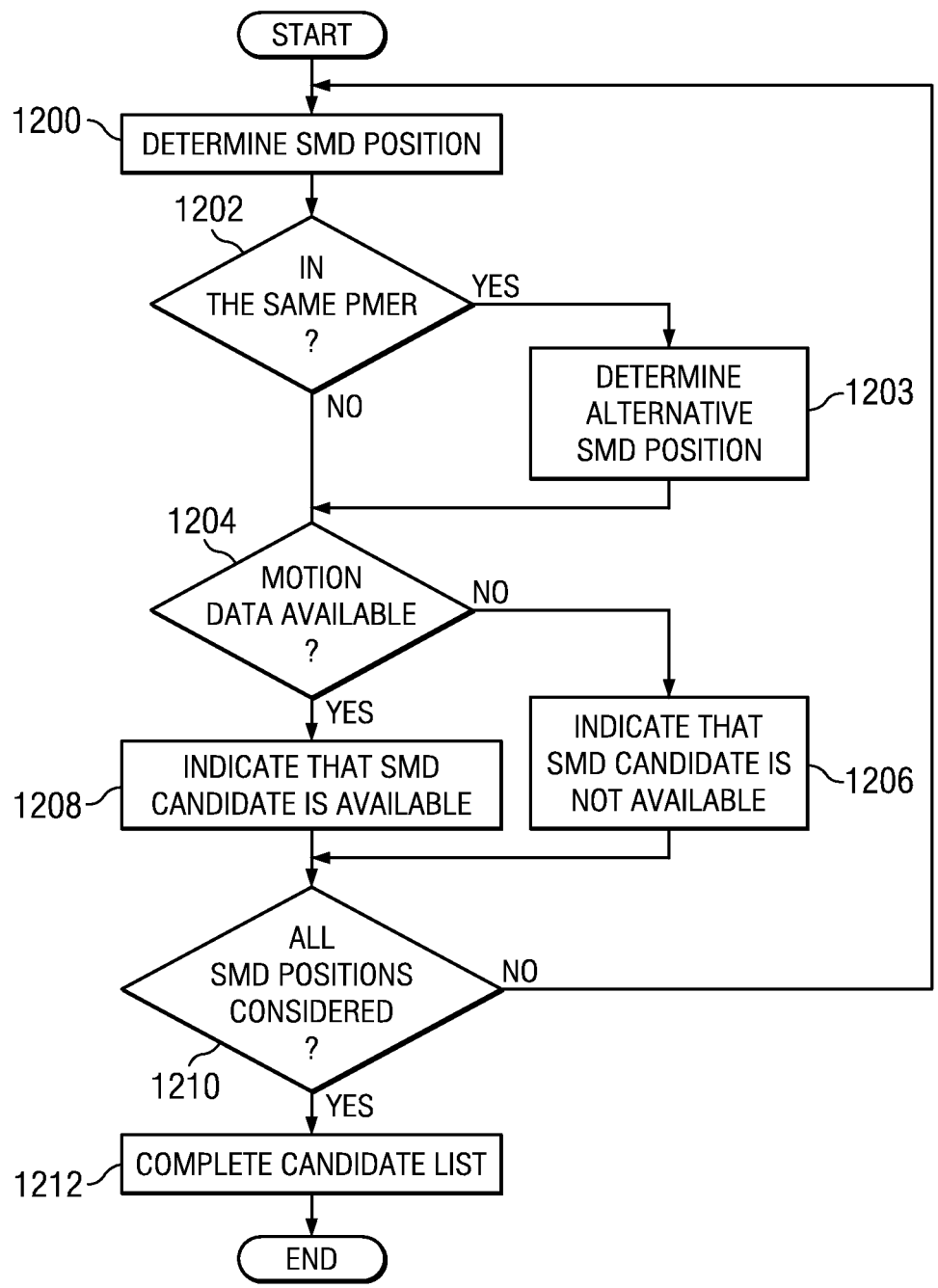

Referring now to the method of FIG. 12, initially an SMD position is determined 1200. Determination of an SMD position is previously described herein. Then, a determination is made as to whether or not the SMD position is in the same PMER as the current PU 1202. A technique for performing this determination is previously described herein.

If the SMD position is in the same PMER as the current PU 1202, an alternative SMD position is determined 1203. In general, if the SMD position is a left SMD position, i.e., position 1 or 4 in FIG. 4, a corresponding position just outside the left boundary of the PMER is used as the alternative SMD position. And, if the SMD position is a top SMD position, i.e., position 2 or 3 in FIG. 4, a corresponding position just outside the top boundary of the PMER is used as the alternative SMD position. In other words, for a left SMD position, the SMD position is moved directly left until it is just outside the left boundary of the PMER to find the corresponding position, and for a top SMD position, the SMD position is moved directly up until it is just outside the top boundary of the PMER to find the corresponding position. Further, in some embodiments, if the SMD position is an above left position, i.e., position 5 in FIG. 4, a corresponding position just outside the top boundary of the PMER is used as the alternative SMD position. In some embodiments, a corresponding position just outside the left boundary of the PMER is used as the alternative SMD position. In some embodiments, a corresponding position just outside the left or top boundary of the PMER having the shorter distance to the upper left SMD position, is used as the alternative SMD position.

The position (xA, yA) of the alternative SMD positions for the SMD positions of FIG. 4 may be computed relative to the luminance coordinates (xP, yP) of the upper left corner of the current PU and the luminance coordinates (xM, yM) of the upper left corner of the current PMER as per Table 3, where nPSW is the width of the current PU and nPSH is the height of the current PU. The luminance coordinates are illustrated relative to PU4 in FIG. 13.

TABLE 3

| SMD Position Index (see FIG. 4) | Position | (xN, yN) | (xA, yA) |
|---|---|---|---|
| 1 | Left down | (xP − 1, yP + nPSH − 1) | (xM − 1, yP + nPSH − 1) |
| 2 | Above | (xP + nPSW − 1, yP − 1) | (xP + nPSW − 1, yM − 1) |
| 3 | Above right | (xP + nPSW, yP − 1) | (xP + nPSW, yM − 1) |
| 4 | Left bottom | (xP − 1, yP + nPSH) | (xM − 1, yP + nPSH) |
| 5 (option 1) | Above left | (xP − 1, yP − 1) | (xP − 1, yM − 1) |
| 5 (option 2) | Above left | (xP − 1, yP − 1) | (xM − 1, yP − 1) |
| 5 (option 3) | Above left | (xP − 1, yP − 1) | if (xP − xM < yP − yM) (xM − 1, yP − 1) else (xP − 1, yM − 1) |

If the SMD position is not in the same PMER 1202 or after an alternative SMD position has been determined 1203, the availability 1204 of motion data for the SMD position is determined. If the motion data is not available 1204, an indication is set 1206 that the SMD candidate for the SMD position is not available, and the next SMD position, if any 1210, is processed. If the motion data is available 1204, an indication is set 1208 that the SMD candidate for the SMD position is available, and the next SMD position, if any 1210, is processed. Once all SMD positions have been considered 1210, the inter-prediction candidate list is completed 1212. Completion of the inter-prediction candidate list is previously described herein. The determination of the index for a reference picture used to derive the TMD candidate may be as previous described or the alternative SMD position for the left down SMD position may be considered if the left down SMD position is in the same PMER.

Figure 14:
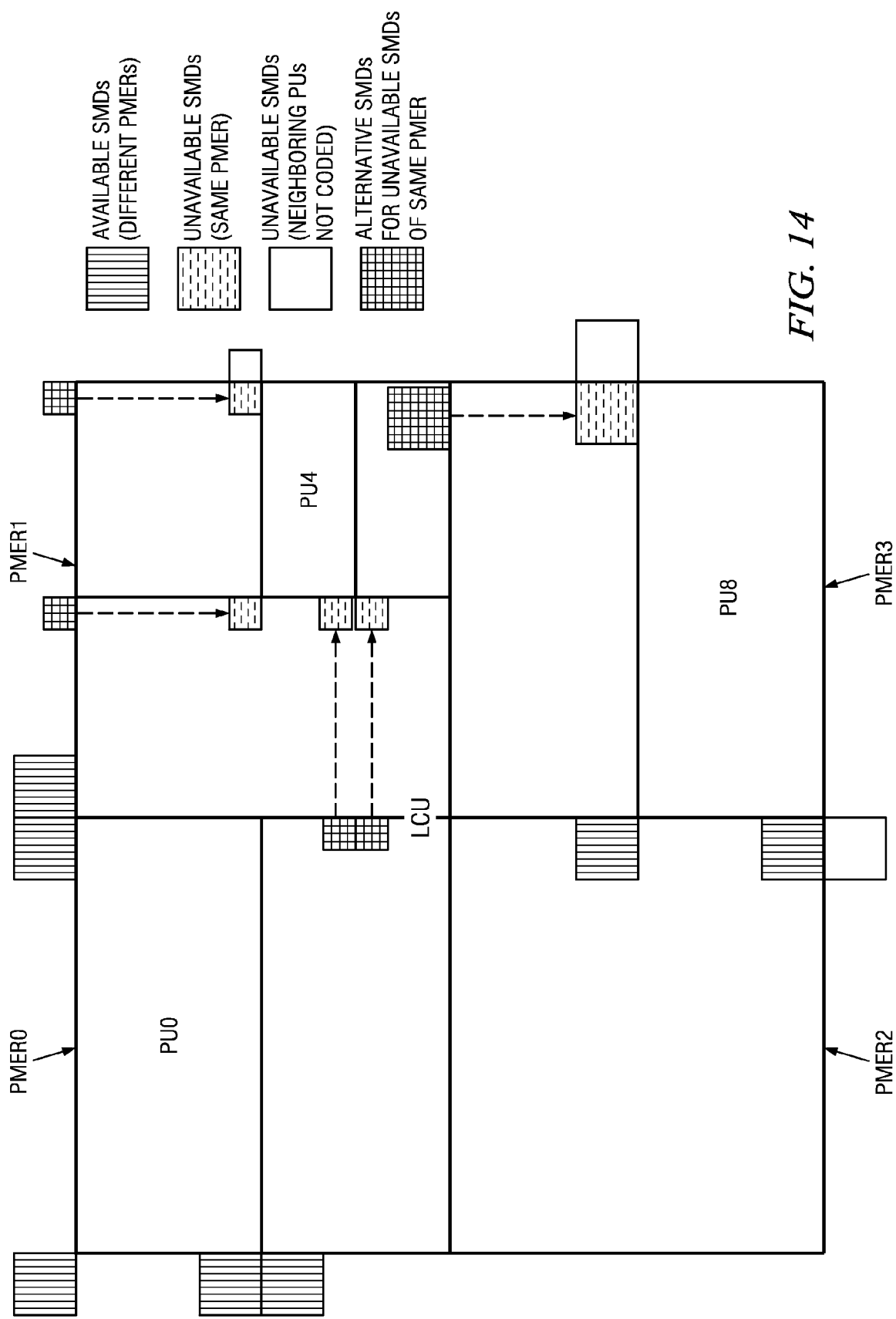

FIG. 14 is an example illustrating availability of SMD positions and alternative SMD positions when the method of FIG. 12 is used. In this example, an LCU is decomposed into PUs as shown and is divided into four PMERs. For PU0 in PMER0, all of the SMD candidates for the SMD positions may be available as the SMD positions are outside PMER0. For PU4 in PMER1, none of the SMD candidates for the SMD positions will be available as the SMD positions are either in PMER1 or in PUs that have not yet been coded (decoded). Alternative SMD positions for the SMD positions that are in PMER1 are shown. SMD candidates for these alternative positions may be available and would be considered when PU4 is processed by the method of FIG. 12. For PU8 in PMER3, some of the SMD candidates may be available as their SMD positions are outside PMER3 and are in PUs that have been coded (decoded) while other SMD candidates will not be available as their SMD positions are either inside PMER3 or are in PUs that have not yet been coded (decoded). An alternative SMD position for the SMD position that is in PMER 3 is shown. The SMD candidates for this alternative position may be available and would be considered when PU8 is processed by the method of FIG. 12.

Figure 15:
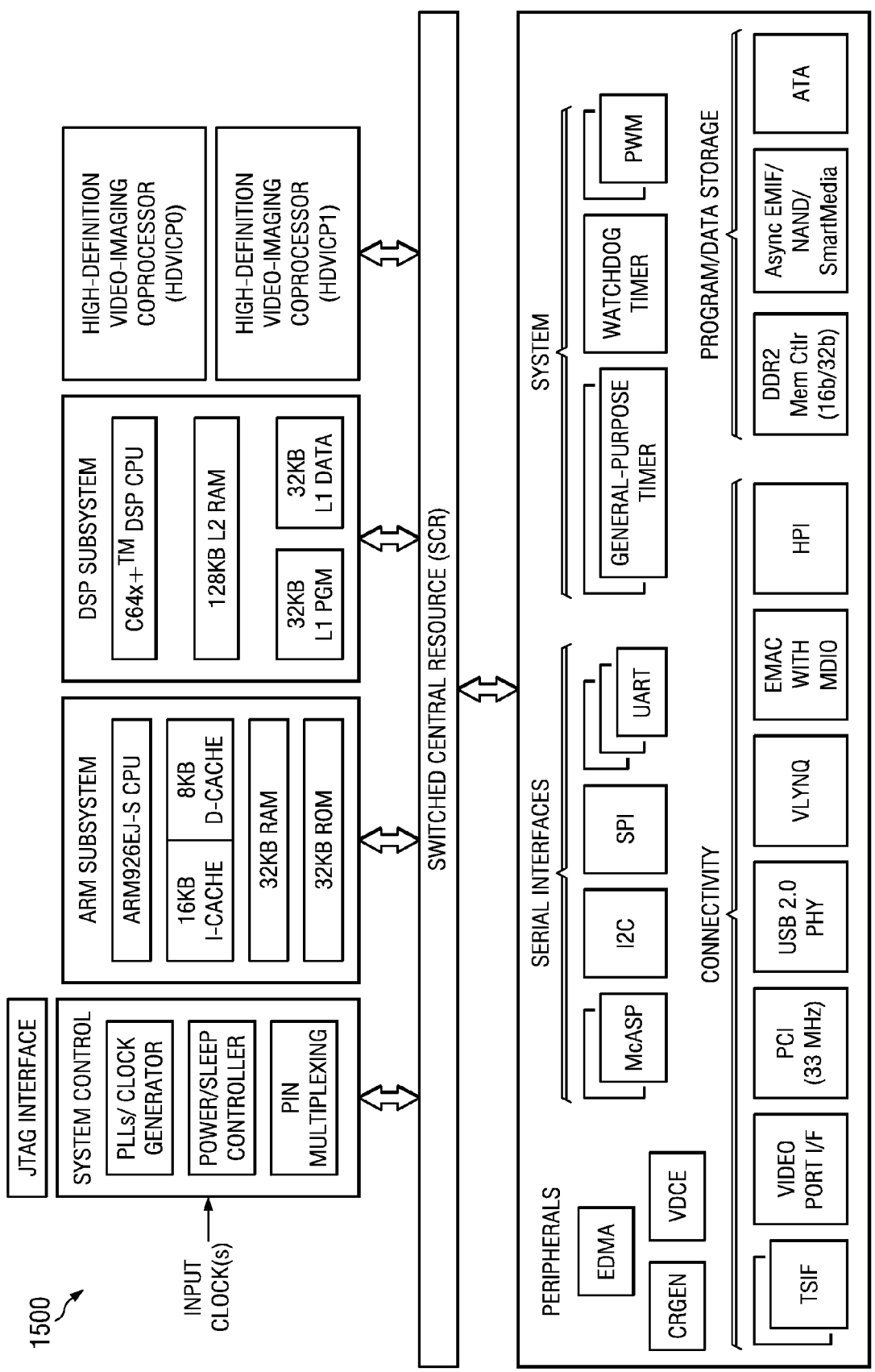
FIG. 15 is a block diagram of an illustrative digital system.

FIG. 15 is a block diagram of an example digital system suitable for use as an embedded system that may be configured to perform construction of inter-prediction candidate lists as described herein for parallel motion estimation during encoding of a video stream and for decoding of such an encoded video stream. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 1500 is a programmable platform designed to meet the processing needs of applications such as video encode/decode/transcode/transrate, video surveillance, video conferencing, set-top box, medical imaging, media server, gaming, digital signage, etc. The SoC 1500 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 1500 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 1500, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 1500 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 15, the SoC 1500 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, mode decision, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 1500 may be configured to perform parallel motion estimation during video encoding using methods for construction of inter-prediction candidate lists as described herein and for decoding of encoded bit streams using methods for construction of inter-prediction candidate lists as described herein. For example, the coding control of the video encoder of FIG. 8 may be executed on the DSP subsystem or the ARM subsystem and at least some of the computational operations of the block processing, including the construction of the inter-prediction candidate lists, motion estimation, entropy encoding, and entropy decoding may be executed on the HDVICP coprocessors. Motion estimation on the HDVICP coprocessors may choose to use different PMER sizes to exploit different motion estimation quality and throughput trade-offs. Entropy encoding on the HDVICP coprocessors may signal the selected PMER size into the encoded bit stream. An entropy decoder on the HDVICP coprocessors may perform the construction of the inter-prediction candidate lists for decoding based on the method of FIG. 10 or of FIG. 12 in the same way as it is done for during parallel motion estimation during encoding.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, in some embodiments, both the method of FIG. 10 and the method of FIG. 12 may be available for use in encoding and decoding. The encoder may choose which method to use and signal the choice to the decoder. The decoder would then use the appropriate method as signaled by the decoder.

In another example, in embodiments providing the method of FIG. 10, use of the method for AMVP list construction may be disabled for encoding. Whether or not the method is used for AMVP list construction in the encoder may signaled to the decoder or a default convention may be set up between the encoder and the decoder, and the decoder operates accordingly. Similarly, in embodiments providing the method of FIG. 12, use of the method for AMVP list construction may be disabled for encoding. Whether or not the method is used for AMVP list construction in the encoder may be signaled to the decoder or a default convention may be set up between the encoder and decoder, and the decoder operates accordingly.

In another example, in some embodiments, separate PMER size signals may be used for the merging candidate list construction and the AMVP candidate list construction. If either signal is set to indicate a 4×4 PMER, the methods described herein will not be used for construction of the corresponding candidate list (merging candidate list or AMVP candidate list) in the encoder or the decoder.

In another example, the PMER size may be signaled in places other than the picture parameter set (PPS), such as, for example, in a slice header, in an adaptation parameter set (APS), or in sequence parameter set (SPS).

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although the method steps may be presented and described herein in a sequential fashion, one or more of the steps shown and described may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method for derivation of spatial motion data (SMD) candidates for a prediction unit (PU) in video coding or decoding, the SMD candidates for inclusion in an inter-prediction candidate list for the PU, the method comprising:
determining an SMD position corresponding to an SMD candidate for the PU, wherein the PU is comprised in a parallel motion estimation region (PMER);
selecting at least some motion data of the SMD position as the SMD candidate when the SMD position is not in the PMER and the motion data is available; and
indicating that the SMD candidate is not available when the SMD position is in the PMER.

2. The method of claim 1, further comprising:
determining an alternative SMD position for the SMD candidate when the SMD position is in the PMER, wherein the alternative SMD position is in a neighboring PMER of the PMER; and
selecting at least some motion data of the alternative SMD position as the SMD candidate when the motion data of the alternative SMD position is available,
wherein indicating that the SMD candidate is not available comprises indicating that the SMD candidate is not available when the SMD position is in the PMER and the motion data of the alternative SMD position is not available.

3. The method of claim 1, further comprising:
receiving an indication of a size of the PMER.

4. The method of claim 3, wherein the size of the PMER is one selected from a group consisting of 4×4, 8×8, 16×16, 32×32, and 64×64.

5. The method of claim 1, wherein the SMD position is one selected from a group consisting of a left down neighboring position, an above neighboring position, an above right neighboring position, a left bottom neighboring position, and an above left neighboring position.

6. The method of claim 2,
wherein the SMD position is one selected from a group consisting of a left down neighboring position, an above neighboring position, an above right neighboring position, a left bottom neighboring position, and an above left neighboring position, and
wherein the alternative SMD position for the left down neighboring position is a corresponding position just outside a left boundary of the PMER, the alternative SMD position for the above neighboring position is a corresponding position just outside a top boundary of the PMER, the alternative SMD position for the above right neighboring position is a corresponding position just outside the top boundary of the PMER, the alternative SMD position for the left bottom neighboring position is a corresponding position just outside the left boundary of the PMER, and the alternative SMD position for the above left neighboring position is one selected from a group consisting of a corresponding position just outside the left boundary of the PMER and a corresponding position just outside the top boundary of the PMER.

7. The method of claim 6, wherein the corresponding position for the left down neighboring positions is at luminance coordinates (xM−1, yP+nPSH−1), the corresponding position for the above neighboring position is at luminance coordinates (xP+nPSW−1, yM−1), the corresponding position for the above right neighboring position is at luminance coordinates (xP+nPSW, yM−1), the corresponding position for the left bottom neighboring position is at luminance coordinates (xM−1, yP+nPSH), the position just outside the left boundary corresponding to the above left neighboring position is at luminance coordinates (xM−1, yP−1), and the position just outside the top boundary corresponding to the above left neighboring position is at luminance coordinates (xP−1, yM−1), wherein (xP, yP) are luminance coordinates of an upper left corner of the PU, (xM, yM) are luminance coordinates of an upper left corner of the PMER, nPSH is a height of the PU, and nPSW is a width of the PU.

8. The method of claim 1, wherein the SMD candidate one selected from a group consisting of a spatial merging candidate and a spatial motion vector predictor (MVP) candidate.

* * * * *